US008693287B2

(12) United States Patent
Nakadai et al.

(10) Patent No.: US 8,693,287 B2
(45) Date of Patent: Apr. 8, 2014

(54) SOUND DIRECTION ESTIMATION APPARATUS AND SOUND DIRECTION ESTIMATION METHOD

(75) Inventors: Kazuhiro Nakadai, Wako (JP); Keisuke Nakamura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 396 days.

(21) Appl. No.: 13/210,987

(22) Filed: Aug. 16, 2011

(65) Prior Publication Data
US 2012/0069714 A1    Mar. 22, 2012

Related U.S. Application Data

(60) Provisional application No. 61/374,376, filed on Aug. 17, 2010, provisional application No. 61/374,380, filed on Aug. 17, 2010.

(51) Int. Cl.
*G01S 3/80* (2006.01)

(52) U.S. Cl.
USPC .......................................................... 367/124

(58) Field of Classification Search
USPC .......................................................... 367/124
See application file for complete search history.

(56) References Cited

U.S. PATENT DOCUMENTS

| 2010/0329479 | A1* | 12/2010 | Nakadai et al. | 381/92 |
| 2012/0069714 | A1* | 3/2012 | Nakadai et al. | 367/125 |
| 2012/0195436 | A1* | 8/2012 | Nakadai et al. | 381/56 |
| 2013/0151249 | A1* | 6/2013 | Nakadai et al. | 704/231 |

FOREIGN PATENT DOCUMENTS

JP    2010-281816    12/2010

OTHER PUBLICATIONS

Nakamura et al.; Intelligent Sound Source Localization and its application to multimodal human tracking; Intelligent Robots and Systems (IROS), 2011 IEEE/RSJ International Conference on Sep. 2011; pp. 143-148.*

Lee, Akinobu et al., "Noise Robust Real World Spoken Dialogue System using GMM Based Rejection of Unintended Inputs," Interspeech 2004—ICSLP, 8th International Conference on Spoken Language Processing, pp. 847-850 (2004).

Nakamura, Keisuke et al., "Intelligent Sound Source Localization for Dynamic Environments," The 2009 IEEE/RSJ International Conference on Intelligent Robots and Systems, pp. 664-669 (2009).

Nishino, Takanori et al., "Interpolating Head Related Transfer Functions in the Median Plane," Proc. 1999 IEEE Workshop on Applications of Signal Processing to Audio and Acoustics, pp. 167-170 (1999).

(Continued)

*Primary Examiner* — Daniel Pihulic
(74) *Attorney, Agent, or Firm* — Nelson Mullins Riley & Scarborough LLP; Anthony A. Laurentano

(57) ABSTRACT

A sound direction estimation apparatus includes a sound source model storage unit that stores likelihood of a sound source class in correspondence with a sound feature quantity, a sound signal input unit that receives a sound signal, a sound source identification unit that identifies a sound source class of the sound signal input from the sound signal input unit with reference to the sound source model storage unit based on the sound feature quantity of the sound signal, and a first sound source localization unit that estimates a sound direction of the sound signal of the sound source class identified by the sound source identification unit.

9 Claims, 19 Drawing Sheets

(56) References Cited

OTHER PUBLICATIONS

Nishiura, Takanobu et al., "Statistical Sound Source Identification in a Real Acoustic Environment for Robust Speech Recognition Using a Microphone Array," Eurospeech 2001 Scandinavia, 7th European Conference on Speech Communication and Technology, pp. 2611-2614 (2001).

Wenzel, Elizabeth M. et al., "Perceptual Consequences of Interpolating Head-Related Trasfer Functions During Spatial Synthesis," 1993 IEEE Workshop on Applications of Signal Processing to Audio and Acoustics, Final Program and Paper Summeries, pp. 102-105 (1993).

* cited by examiner

SOUND DIRECTION ESTIMATION APPARATUS AND SOUND DIRECTION ESTIMATION METHOD

CROSS REFERENCE TO RELATED APPLICATIONS

This application claims benefit from U.S. Provisional application Ser. No. 61/374,376, filed Aug. 17, 2010, and U.S. Provisional application Ser. No. 61/374,380, filed Aug. 17, 2010, the contents of which are incorporated herein by reference.

BACKGROUND OF THE INVENTION

1. Field of the Invention

The present invention relates to a sound direction estimation apparatus and a sound direction estimation method.

2. Description of Related Art

With the advancement in robotics technology, robots having artificial intelligence have been developed. These robots are expected to have faculty in recognizing a command given by a person or faculty in understanding surrounding circumstances. An example of surrounding circumstances is the direction of a sound source. Regarding a sound direction estimation technique employed by a humanoid robot, a sound direction estimation apparatus described in JP-A-2010-281816 is known.

The sound direction estimation apparatus described in JP-A-2010-281816 includes sound signal input means for inputting a sound signal, correlation matrix calculation means for calculating a correlation matrix of the input sound signal, and eigenvector calculation means for calculating an eigenvector of the correlation matrix using the calculated correlation matrix. The eigenvector calculation means calculates the eigenvector using the correlation matrix of the input sound signal and one or more predetermined correlation matrices.

SUMMARY OF THE INVENTION

However, the sound direction estimation apparatus described in JP-A-2010-281816 performs the processes regardless of sound classes and thus cannot estimate the direction of a sound source of a specific class.

The invention is made in consideration of the above-mentioned problem and provides a sound direction estimation apparatus and a sound direction estimation method that can estimate a direction of a sound source of a specific class.

(1) According to a first aspect of the invention, there is provided a sound direction estimation apparatus including: a sound source model storage unit that stores likelihood of a sound source class in correspondence with a sound feature quantity; a sound signal input unit that receives a sound signal; a sound source identification unit that identifies a sound source class of the sound signal input from the sound signal input unit with reference to the sound source model storage unit based on the sound feature quantity of the sound signal; and a first sound source localization unit (sound source localization units 111, 211, 311, and 411) that estimates a sound direction of the sound signal of the sound source class identified by the sound source identification unit.

(2) A sound direction estimation apparatus according to a second aspect of the invention is the sound direction estimation apparatus according to the first aspect, further including: a second sound source localization unit (sound source localization unit 104) that estimates a sound direction of the sound signal input from the sound signal input unit; and a sound source separation unit that separates the sound signal input from the sound signal input unit into sound signals by sound sources based on the sound direction estimated by the second sound source localization unit, wherein the first sound source localization unit estimates the sound directions of the sound signals separated by the sound source separation unit.

(3) A sound direction estimation apparatus according to a third aspect of the invention is the sound direction estimation apparatus according to the second aspect, further including a correlation matrix calculation unit that calculates a correlation matrix of the sound signals separated by the sound source separation unit, wherein the first sound source localization unit estimates the sound directions of the sound signals separated by the sound source separation unit based on the correlation matrix calculated by the correlation matrix calculation unit and a correlation matrix of the sound signal input from the sound signal input unit.

(4) A sound direction estimation apparatus according to a fourth aspect of the invention is the sound direction estimation apparatus according to the third aspect, further including a correlation matrix information storage unit that stores correlation matrix information by discrete sound directions, wherein the correlation matrix calculation unit calculates the correlation matrix corresponding to the sound direction estimated by the second sound source localization unit using the correlation matrix information corresponding to a discrete sound direction adjacent to the sound direction estimated by the second sound source localization unit.

(5) A sound direction estimation apparatus according to a fifth aspect of the invention is the sound direction estimation apparatus according to the fourth aspect, wherein the correlation matrix information includes a square matrix based on a transfer function vector having transfer functions from a sound source to sound input elements as elements and a ratio matrix indicating a ratio of the square matrix and a square matrix of the adjacent discrete sound direction, wherein the correlation matrix calculation unit calculates a regular matrix by expanding eigenvalues of a square matrix obtained by interpolating the square matrix indicated by the correlation matrix information corresponding to the discrete sound direction in a frequency domain, and calculates a diagonal matrix by expanding eigenvalues of a square matrix interpolated by raising the ratio matrix indicated by the correlation matrix information corresponding to the discrete sound direction to power, and wherein the correlation matrix calculation unit calculates the correlation matrix corresponding to the sound direction estimated by the second sound source localization unit using the regular matrix and the diagonal matrix.

(6) A sound direction estimation apparatus according to a sixth aspect of the invention is the sound direction estimation apparatus according to the third aspect, wherein the first sound source localization unit sets the correlation matrix of the sound signal input from the sound signal input unit to a unit matrix, calculates a spatial spectrum based on an eigenvector calculated by expanding eigenvalues of the correlation matrix calculated by the correlation matrix calculation unit, and estimates sound direction information in which the peak of the calculated spatial spectrum is minimized.

(7) A sound direction estimation apparatus according to a seventh aspect of the invention is the sound direction estimation apparatus according to the second aspect, wherein the sound source separation unit separates the sound signal input from the sound signal input unit into the sound signals by sound sources based on the sound directions estimated by the first sound source localization unit.

(8) A sound direction estimation apparatus according to an eighth aspect of the invention is the sound direction estimation apparatus according to any one of the fourth to sixth aspects, further including: a direction input unit that receives direction information; and a correlation matrix transform unit that transforms the correlation matrix corresponding to the sound direction estimated by the second sound source localization unit by the use of correlation matrix information based on the direction information input from the direction input unit, wherein the first sound source localization unit estimates the sound directions of the sound signals separated by the sound source separation unit based on the correlation matrix transformed by the correlation matrix transform unit.

(9) According to a ninth aspect of the invention, there is provided a sound direction estimation method in a sound direction estimation apparatus having a sound source model storage unit that stores likelihood of a sound source class in correspondence with a sound feature quantity, the sound direction estimation method including: causing the sound direction estimation apparatus to receive a sound signal; causing the sound direction estimation apparatus to identify the sound source class of the input sound signal with reference to the sound source model storage unit; and causing the sound direction estimation apparatus to estimate the sound direction of the sound signal of the identified sound source class.

In the sound direction estimation apparatus according to the first aspect of the invention, it is possible to simultaneously estimate the sound source class and the sound direction of an input sound signal.

In the sound direction estimation apparatus according to the second aspect of the invention, since the sound signal from the primarily-estimated sound direction is extracted and then the final sound direction of the extracted sound signal is estimated, it is possible to estimate the sound direction for each sound source with high precision.

In the sound direction estimation apparatus according to the third aspect of the invention, it is possible to estimate the sound direction for each sound source by paying attention to a component of each target sound source.

In the sound direction estimation apparatus according to the fourth aspect of the invention, since the correlation matrix corresponding to the estimated sound direction can be interpolated, it is possible to calculate a correlation matrix corresponding to an arbitrary sound direction.

In the sound direction estimation apparatus according to the fifth aspect of the invention, it is possible to smoothly interpolate a correlation matrix for both amplitude and phase information.

In the sound direction estimation apparatus according to the sixth aspect of the invention, it is possible to estimate sound direction information without sequentially interpolating the transfer functions or the square matrix.

In the sound direction estimation apparatus according to the seventh aspect of the invention, it is possible to separate the sound signal by sound sources having different sound directions and to estimate the sound directions of the sound sources with high precision.

In the sound direction estimation apparatus according to the eighth aspect of the invention, it is possible to estimate a sound direction based on the variation of the input direction information.

In the sound direction estimation method according to the ninth aspect of the invention, it is possible to simultaneously estimate the sound source class and the sound direction of an input sound signal.

DETAILED DESCRIPTION OF THE INVENTION

First Embodiment

Hereinafter, a first embodiment of the invention will be described with reference to the accompanying drawings.

Figure 1:
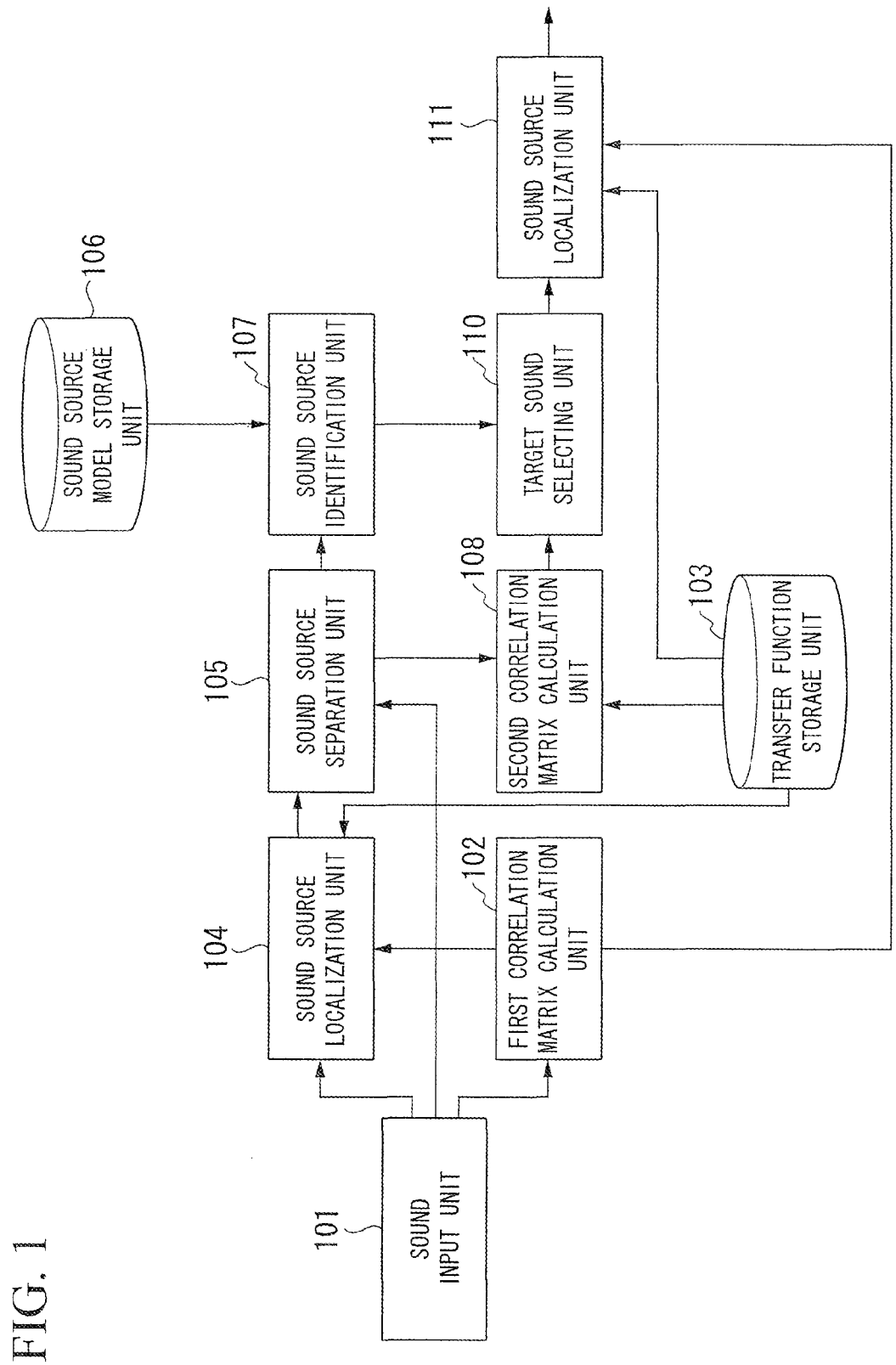
FIG. 1 is a diagram schematically illustrating the configuration of a sound direction estimation apparatus according to a first embodiment of the invention.

FIG. 1 is a diagram schematically illustrating the configuration of a sound direction estimation apparatus 1 according to the first embodiment of the invention. The sound direction estimation apparatus 1 includes a sound input unit 101, a first correlation matrix calculation unit 102, a transfer function storage unit 103, a sound source localization unit 104, a sound source separation unit 105, a sound source model storage unit 106, a sound source identification unit 107, a second correlation matrix calculation unit 108, a target sound selecting unit 110, and a sound source localization unit 111.

In this configuration, the sound source localization unit 104 estimates first sound direction information as primary candidates using a multiple signal classification (MUSIC) method. Note that a general MUSIC method may be referred to as a standard eigenvalue decomposition MUSIC method (SEVD-MUSIC method). The sound source separation unit 105 separates an input sound signal by sound sources based on the estimated sound direction information. The sound source identification unit 107 identifies sound source classes of the separated sound signals based on a hierarchical Gaussian mixture model (GMM). The sound source localization unit 111 estimates second sound direction information (secondary candidates) for each sound source of which the sound source class is identified using a GEVD (Generalized Eigenvalue decomposition)-MUSIC method. In this manner, the sound direction estimation apparatus 1 estimates the first sound direction information to identify the sound source class of each sound source and estimates the second sound direction information of each sound source of which the sound source class is identified. Accordingly, it is possible to estimate the class and the second sound direction information for each sound source in mixed sound in which plural classes of sound signals are mixed.

The sound input unit 101 includes M sound input elements (for example, microphones) (where M is an integer of 2 or greater) and the sound input elements are disposed at different positions. The sound input unit 101 is, for example, a microphone array having M microphones. Each sound input element transforms a received sound wave into a one-channel sound signal.

The sound input unit 101 arranges the transformed sound signals in parallel for every channel and outputs the resultant signal as a multichannel (M-channel) sound signal to the first correlation matrix calculation unit 102, the sound source localization unit 104, and the sound source separation unit 105.

The first correlation matrix calculation unit 102 performs a discrete Fourier transform (DFT) on the sound signals in the time domain of the channels input from the sound input unit 101. Accordingly, the first correlation matrix calculation unit 102 transforms the sound signals in the time domain into an input spectrum x in the frequency domain. The input spectrum x is an M-column vector having values in the frequency domain of the channels as elements.

The first correlation matrix calculation unit 102 calculates an input correlation matrix Rxx for each frequency based on the calculated input spectrum x. Here, the first correlation matrix calculation unit 102 calculates the input correlation matrix, for example, using Equation 1.

$$R_{xx} = E[xx^*] \quad (1)$$

In Equation 1, x* represents a complex conjugate transpose operator of the input spectrum x (vector). E[xx*] represents an expected value (for example, a temporal average over a predetermined time up to now) of a matrix xx*. An expected value is, for example, a temporal average over a predetermined time frame until the present time.

The first correlation matrix calculation unit 102 outputs the calculated input correlation matrix $R_{xx}$ to the sound source localization unit 104 and the sound source localization unit 111.

The transfer function storage unit 103 stores a predetermined number of (for example, 72)(=360°/5°, when the sound direction $\phi$ has an interval of 5°) transfer function vectors $D(\phi)$ in correspondence with the sound directions $\phi$. The elements of the transfer function vectors $D(\phi)$ are transfer functions of frequencies from a sound source to the microphones of the sound input unit 101.

The sound source localization unit 104 estimates first sound direction information (first candidates) of each sound source based on the input correlation matrix $R_{xx}$ input from the first correlation matrix calculation unit 102.

Specifically, the sound source localization unit 104 estimates the first sound direction information of each sound source, for example, using a general MUSIC method.

When a general MUSIC method is used, the sound source localization unit 104 calculates eigenvalues $\delta_i$ and eigenvectors $e_i$ of the input correlation matrix $R_{xx}$ so as to satisfy Equation 2.

$$Re_i = \delta_i e_i \quad (2)$$

The sound source localization unit 104 stores sets of the eigenvalue $\delta_i$ and the eigenvector $e_i$ satisfying Equation 2. Here, i represents an index which is an integer equal to or greater than 1 and equal to or less than M. The order of 1, 2, . . . and M of indices i is the descending order of the eigenvalues $\delta_i$.

The sound source localization unit 104 calculates a spatial spectrum $P(\phi)$ based on the transfer function vectors $D(\phi)$ selected from the transfer function storage unit 103 and the calculated eigenvector $e_i$ using Equation 3.

$$P(\phi) = \frac{|D^*(\phi)D(\phi)|}{\sum_{i=L+1}^{K} |D^*(\phi)e_i|} \quad (3)$$

In Equation 3, $|D^*(\phi)D(\phi)|$ represents the absolute value of a scalar value $D^*(\phi)D(\phi)$. L represents the maximum number of recognizable sound sources and is a predetermined value (for example, 3). In this embodiment, L<M is set. K represents the number of eigenvectors $e_i$ stored in the sound source localization unit 104. K is a predetermined integer satisfying K≤M. That is, the eigenvector $e_i$ (L+1≤i≤K) is a vector value indicating the characteristics of components (for example, noise) considered not to be a sound source. Therefore, the spatial spectrum $P(\phi)$ indicates a ratio of the components other than a sound source to the components propagating from the sound source.

The sound source localization unit 104 acquires the spatial spectrum $P(\phi)$ in a predetermined frequency band using Equation 3. The predetermined frequency band is, for example, a frequency band in which a sound pressure based on a sound signal possible as a sound source is great and a sound pressure of noise is small. The frequency band is, for example, 0.5 to 2.8 kHz, when the sound source is a voice uttered by a person.

The sound source localization unit 104 extends the calculated spatial spectrum $P(\phi)$ in the frequency band to a band broader than the frequency band to calculate an extended spatial spectrum $P_{ext}(\phi)$.

Specifically, the sound source localization unit 104 calculates a signal-to-noise (S/N) ratio based on the input multichannel sound signal and selects a frequency band ω in which the calculated S/N ratio is higher than a predetermined threshold (that is, noise is smaller).

The sound source localization unit 104 calculates the eigenvalues $\delta_i$ using Equation 2 in the selected frequency band ω. The extended spatial spectrum $P_{ext}(\phi)$ is calculated by multiplying the spatial spectrum $P(\phi)$ by a square root of the maximum eigenvalue $\delta_{Max}$ out of the eigenvalue $\delta_i$ calculated by the sound source localization unit 104 and summing the multiplied values (see Equation 4).

$$P_{ext}(\phi) = \frac{1}{|\Omega|} \sum_{k \in \Omega} \sqrt{\delta_{max}(\omega)} \, P_k(\phi) \qquad (4)$$

In Equation 4, $\Omega$ represents a set of frequency bands, $|\Omega|$ represents the number of elements of the set $\Omega$, and k represents an index indicating a frequency band. Accordingly, the characteristic of the frequency band ω in which the value of the spatial spectrum $P(\phi)$ is great is strongly reflected in the extended spatial spectrum $P_{ext}(\phi)$.

The sound source localization unit 104 selects the peak value (the local maximum value) of the extended spatial spectrum $P_{ext}(\phi)$ and a corresponding angle $\phi$. The selected angle $\phi$ is estimated as a sound direction.

The peak value means a value of the extended spatial spectrum $P_{ext}(\phi)$ at the angle $\phi$ which is greater than the value of the extended spatial spectrum $P_{ext}(\phi-\Delta\phi)$ at an angle $\phi-\Delta\phi$ apart by a minute amount $\Delta\phi$ in a negative direction from the angle $\phi$ and the value of the extended spatial spectrum $P_{ext}(\phi+\Delta\phi)$ at an angle $\phi+\Delta\phi$ apart by a minute amount $\Delta\phi$ in a positive direction from the angle $\phi$. $\Delta\phi$ is a quantization width of the sound direction $\phi$ and is, for example, 1°.

The sound source localization unit 104 extracts the (first) maximum value to the L-th maximum value out of the peak values of the extended spatial spectrum $P_{ext}(\phi)$ and selects the sound directions $\phi_l$ ($1 \leq l \leq L$) corresponding to the extracted peak values. The sound source localization unit 104 generates sound direction information representing the selected sound directions $\phi_l$.

The sound source localization unit 104 may use, for example, a WDS-BF (weighted delay and sum beam forming) method instead of the MUSIC method to estimate the direction information of each sound source.

The sound source localization unit 104 outputs the generated sound direction information to the sound source separation unit 105.

The sound source separation unit 105 separates the sound signal $s_l$ of each sound source 1 form the multi-channel sound signal input from the sound input unit 101 based on the input sound direction information. The sound source separation unit 105 may perform an operation of calculating a spatial filter coefficient having the highest directivity to the sound direction $\phi_l$ of each sound source 1, for example, depending on the arrangement of the sound input elements of the sound input unit 11 and convoluting the calculated spatial filter coefficient into the multi-channel sound signal so as to extract the sound signal $s_l$.

The sound source separation unit 105 outputs the separated sound signal $s_l$ of each sound source 1 to the sound source identification unit 107 and the second correlation matrix calculation unit 108. The sound source separation unit 105 outputs the input sound direction information to the second correlation matrix calculation unit 108.

The sound source identification unit 107 determines class information $\lambda_l$ indicating the class of each sound source 1 based on the sound signal $s_l$ input from the sound source separation unit 105. For example, the sound source identification unit 107 determines the class information $\lambda_l$ using a sound source identification method based on a hierarchical Gaussian mixture model (h-GMM). The sound source identification unit 107 outputs the determined class information $\lambda_l$ to the target sound selecting unit 110.

Here, the sound source identification unit 107 uses hierarchical Gaussian mixture model information including GMM hierarchical relationship information having one or more pieces of hierarchy information and likelihood of the class information $\lambda$ corresponding to a sound feature quantity x in the sound source identification method based on the h-GMM. The hierarchy information is information using certain class information as root information and indicating the relationship between one or more sub class information pieces belonging to the root information. In this embodiment, the sound source classes are allocated to the class information and the sub class information so that the sound source class indicated by the class information corresponds to the generic concept of the sound source class indicated by the sub class information. The GMM hierarchical relationship information indicates the relationship between the hierarchy information pieces in which sub class information included in certain hierarchy information corresponds to root information included in other hierarchy information.

Therefore, the sound source model storage unit 106 stores the hierarchical Gaussian mixture model information in advance.

The GMM hierarchical relationship information according to this embodiment will be described below.

Figure 2:
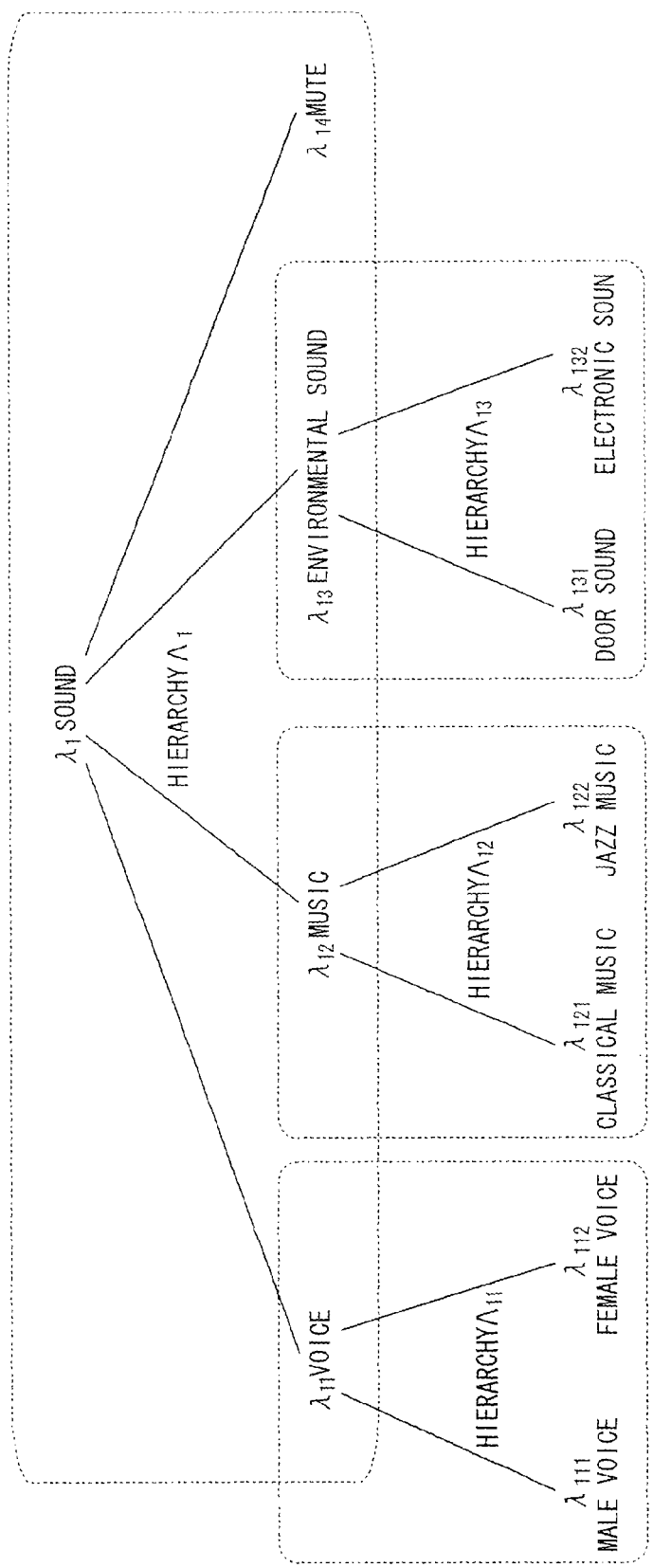
FIG. 2 is a conceptual diagram illustrating an example of GMM hierarchical relationship information according to the first embodiment of the invention.

FIG. 2 is a conceptual diagram illustrating an example of the GMM hierarchical relationship information according to this embodiment.

In the GMM hierarchical relationship information show in FIG. 2, the highest level (hierarchy information) $\Lambda_1$ includes class information $\lambda_1$ indicating sound as root information and class information $\lambda_{11}$ indicating a voice, class information $\lambda_{12}$ indicating music, class information $\lambda_{13}$ indicating environmental sound, and class information $\lambda_{14}$ indicating mute state as sub class information.

The second highest level includes a hierarchy $\Lambda_{11}$ including the class information $\lambda_{11}$ as root information, a hierarchy $\Lambda_{12}$ including the class information $\lambda_{12}$ as root information, and a hierarchy $\Lambda_{13}$ including the class information $\lambda_{13}$ as root information.

The hierarchy $\Lambda_{11}$ includes class information $\lambda_{111}$ indicating a male voice and class information $\lambda_{112}$ indicating a female voice as sub class information. The hierarchy $\Lambda_{12}$ includes class information $\lambda_{121}$ indicating classical music and class information $\lambda_{122}$ indicating jazz music as sub class information. The hierarchy $\Lambda_{13}$ includes class information $\lambda_{131}$ indicating door sound and class information $\lambda_{132}$ indicating electronic sound as sub class information.

The sound source identification unit 107 performs the following process to determine the class information $\lambda_1$.

Figure 3:
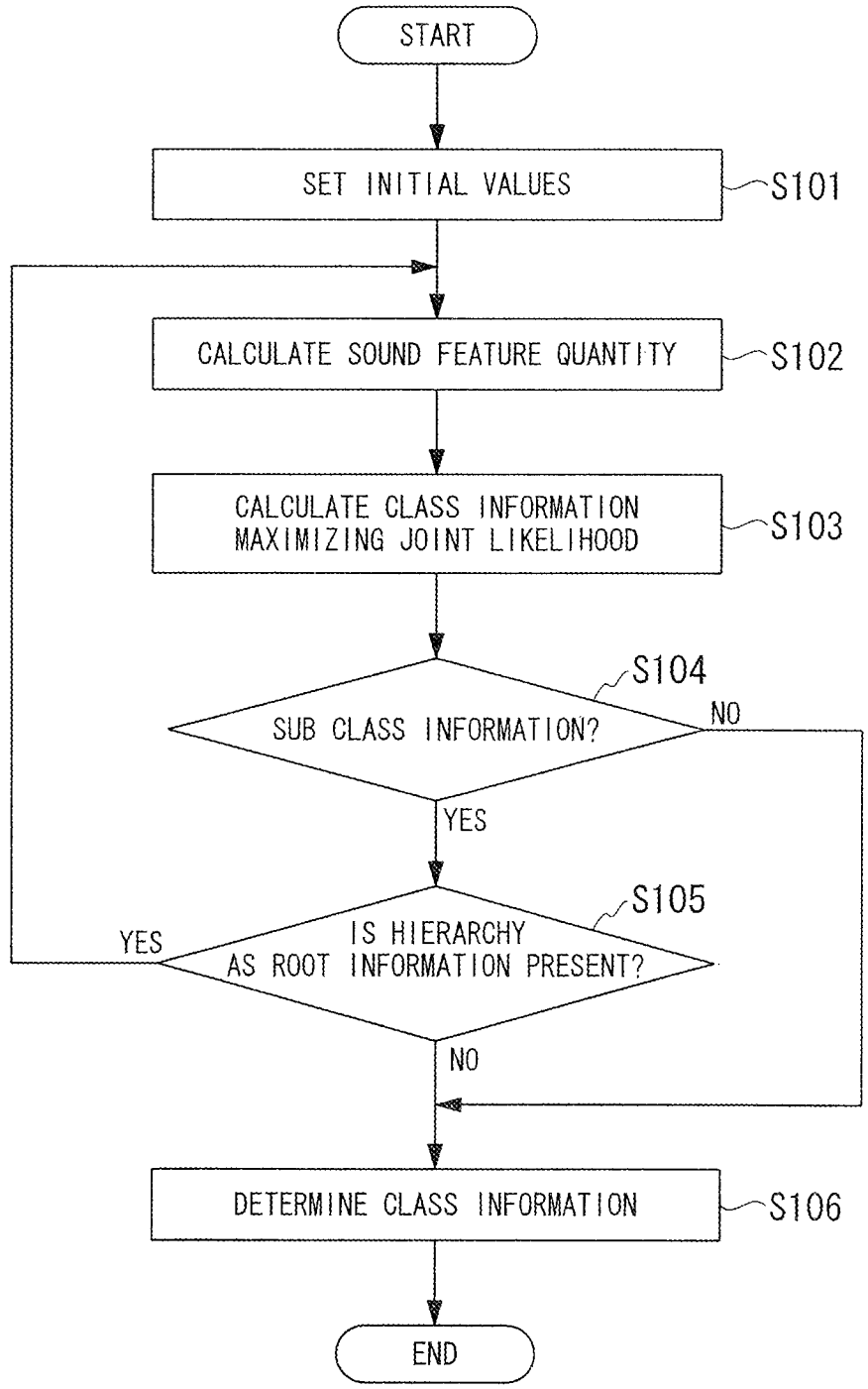
FIG. 3 is a flowchart illustrating a class information determining process according to the first embodiment of the invention.

FIG. 3 is a flowchart illustrating a class information determining process according to this embodiment.

(Step S101) The sound source identification unit 107 initially sets a hierarchy $\Lambda_i$ of interest as the highest hierarchy $\Lambda_1$. Thereafter, the process of step S102 is performed.

(Step S102) The sound source identification unit 107 calculates a sound feature quantity $x_t$ based on the sound signal $s_l$ input from the sound source separation unit 105. Here, t represents a frame time. The sound feature quantity $x_t$ is, for example, 24-dimension Mel-frequency cepstrum coefficient (MFCC). In this case, the sound source identification unit 107 vector-quantizes the sound feature quantity $x_t$ by selecting one closest to the sound feature quantity $x_t$ out of plural candidate vectors stored in advance. Thereafter, the process of step S103 is performed.

(Step S103) The sound source identification unit 107 reads the likelihood $f(x_t|\lambda)$ of the calculated sound feature quantity $x_t$ with respect to the class information $\lambda$ included in the hierarchy $\Lambda_i$ from the sound source model storage unit 106.

The sound source identification unit 107 calculates the joint likelihood based on the read likelihood $f(x_t|\lambda)$ and determines the class information $\lambda'$ maximizing the joint likelihood. The determined class information $\lambda'$ is expressed by Equation 5

$$\lambda' = \arg_\lambda \left[ \max \prod_{k=0}^{N-1} f(x_{t+k}|\lambda) \right] \quad (5)$$

In Equation 5, max . . . indicates the maximum value of a parameter . . . $\arg_\lambda [\ldots]$ indicates a parameter $\lambda$ maximizing a function of the parameter $\lambda$. k represents the frame time from frame time t. N represents a predetermined number of frames, that is, the time for calculating the joint likelihood. Therefore, t indicates the head frame of the time. Thereafter, the process of step S104 is performed.

(Step S104) The sound source identification unit 107 determines whether the class information $\lambda'$ is sub class information $\lambda$ included in the hierarchy $\Lambda_i$ of interest. When the sound source identification unit 107 determines that the class information $\lambda'$ is sub class information $\lambda$ included in the hierarchy $\Lambda_i$ of interest (YES in step S104), the process of step S105 is performed.

When the sound source identification unit 107 determines that the class information $\lambda'$ is not sub class information $\lambda$ included in the hierarchy $\Lambda_i$ of interest, that is, is root information (NO in step S104), the process of step S106 is performed.

(Step S105) The sound source identification unit 107 determines whether a hierarchy $\Lambda'$ including class information $\lambda'$ as root information is present. When the sound source identification unit 107 determines that a hierarchy $\Lambda'$ including class information $\lambda'$ as root information is present (YES in step S105), the hierarchy $\Lambda'$ is set as the hierarchy $\Lambda_i$ of interest and the process of step S103 is performed.

When the sound source identification unit 107 determines that a hierarchy $\Lambda'$ including class information $\lambda'$ as root information is not present (NO in step S105), the process of step S106 is performed.

(Step S106) The sound source identification unit 107 determines the class information $\lambda'$ as the class information $\lambda_1$ of the sound source 1 at frame time t.

The second correlation matrix calculation unit 108 calculates the correlation matrix $V_I$ (sound source correction matrix) of each sound source 1 based on the sound signal $s_I$ and the sound direction information input from the sound source separation unit 105 and outputs the calculated sound source correlation matrix $V_I$ to the target sound selecting unit 110.

Here, the second correlation matrix calculation unit 108 reads the transfer function vector $D(\phi_I)$ corresponding to the sound direction $\phi_I$ indicated by the sound direction information input from the sound source separation unit 105 or the transfer function vectors $D(\phi_1)$ corresponding to the direction $\phi_1$ closest to the sound direction $\phi_I$ from the transfer function storage unit 103. In this embodiment, for the purpose of simplifying the explanation, the read transfer function vectors $D(\phi_I)$ and $D(\phi_1)$ are both described as $D(\phi_I)$.

The second correlation matrix calculation unit 108 performs the discrete Fourier transform on the sound signal $s_I$ input from the sound source separation unit 105 to transform the sound signal into a spectrum $S_I$ in the frequency domain.

The second correlation matrix calculation unit 108 generates a transfer function vector $\{D(\phi_I)S_I\}$ of each sound source by multiplying the read transfer function vectors $D(\phi_I)$ by the spectrum $S_I$. The second correlation matrix calculation unit 108 calculates a matrix having products of element values of the transfer function vectors of the sound sources as elements as the sound source correlation matrix $V_I$, as expressed by Equation 6. The sound source correlation matrix $V_I$ indicates the spectrum correlation between the channels received from the sound source 1.

$$V_I = \{D(\phi_I)S_I\}\{D(\phi_I)S_I\}^* \quad (6)$$

The target sound selecting unit 110 calculates a correlation matrix $K_\lambda$ corresponding to the class information $\lambda$ indicating the class of a target sound source (target sound) based on the correlation matrix $V_I$ of each sound source 1 input from the second correlation matrix calculation unit 108 and the class information $\lambda$ (sound source class) of each sound source 1 input from the sound source identification unit 107. The target sound selecting unit 110 outputs the calculated correlation matrix $K_\lambda$ to the sound source localization unit 111.

The target sound selecting unit 110 uses, for example, Equation 7 to calculate the correlation matrix $K_\lambda$. Here, the target sound selecting unit 110 calculates the correlation matrix $K_\lambda$ of each target sound by multiplying the inverse matrix $V_i^{-1}$ of the correlation matrix $V_i$ of the sound source i corresponding to the class information $\lambda$ indicating the target sound by the matrix acquired by multiplication. The correlation matrix $K_\lambda$ serves to extract the component of the target sound when the sound source localization unit 111 calculates the sound direction information.

$$K_\lambda = \prod_{i \in \lambda} V_i^{-1} \quad (7)$$

The target sound selecting unit 110 may calculate the correlation matrix Kx using Equation 8 instead of Equation 7. The target sound selecting unit 110 multiplies all the correlation matrices $V_j$ of the sound sources j corresponding to the class information $\lambda$ indicating the classes of non-target sound sources (non-target sound). The target sound selecting unit 110 calculates the correlation matrix $K_\lambda$ of each target sound by multiplying the inverse matrices $V_i^{-1}$ of the correlation matrices $V_i$ of the sound sources i corresponding to the class information $\lambda$ indicating the classes of target sound sources (target sound) by the matrix acquired by multiplication. That is, the correlation matrix $K_\lambda$ indicates the ratio of the correlation matrix $V_j$ of the non-target sound to the correlation matrix $V_i$ of the target sound. The correlation matrix $K_\lambda$ serves to extract the component of the target sound and to remove the components of the non-target sound when the sound source localization unit 111 calculates the sound direction information.

$$K_\lambda = \prod_{j \notin \lambda} V_j \prod_{j \in \lambda} V_i^{-1} \quad (8)$$

The target sound selecting unit 110 may perform the following process to calculate the correlation matrix $K_\lambda$ of each class $\lambda$. Here, the second correlation matrix calculation unit 108 calculates a summed sound source signal $z_l$ by summing 1 sound source signals $s_l, \ldots s_l$ from sound source 1 to sound source 1.

The second correlation matrix calculation unit 108 performs the discrete Fourier transform on the summed sound source signal $z_l$ to calculate the summed sound source spectrum $Z_l$ and substitutes the calculated summed sound source spectrum $Z_l$ for Equation 1 to calculate the 1-th input correlation matrix $R_l$.

As expressed by Equation 9, the second correlation matrix calculation unit 108 repeatedly calculates the sound source correlation matrix $C_l$ corresponding to the sound source 1 by multiplying the 1-th input correlation matrix $R_l$ by the inverse matrices $C_1^{-1}, \ldots, C_{l-1}^{-1}$ from sound source 1 to sound source $l-1$.

$$C_l = R_l \prod_{i=1}^{l-1} C_i^{-1} \quad (9)$$

The second correlation matrix calculation unit 108 outputs the calculated sound source correlation matrix $C_l$ of each sound source 1 to the target sound selecting unit 110.

The target sound selecting unit 110 calculates the correlation matrix $K_\lambda$ of the class information $\lambda$ by multiplying all the sound source correlation matrices of the non-target sound j out of the sound source correlation matrices $C_j$ input from the second correlation matrix calculation unit 108, as expressed by Equation 10.

$$K_\lambda = \prod_{j \notin v} C_j \quad (10)$$

The target sound selecting unit 110 may calculate the correlation matrix K using a listening matrix obtained by scaling the sound source correlation matrix depending on an interest index $D_1$. The target sound selecting unit 110 outputs the calculated correlation matrix K to the sound source localization unit 111 and the sound source localization unit 111 uses the input correlation matrix K as the correlation matrix $K_\lambda$. Accordingly, in this embodiment, it is possible to calculate the sound direction information of a sound source of a class in which a user has a high interest.

The interest index $D_1$ is a parameter indicating the degree of interest in each sound source 1 by a user and is a real number having a value in the range of $-1$ to 1. The smaller interest index $D_1$ means the higher interest in sound source 1. The interest index means that sound source 1 is fully listened to when $D_1 = -1$ and sound source 1 is neglected when $D_1 = 1$.

Therefore, the target sound selecting unit 110 expands the eigenvalues of the sound source correlation matrix $C_l$ so as to satisfy Equation 11 to calculate M eigenvalues $\delta_{l,1}, \ldots, \delta_{l,M}$ and eigenvectors $e_{l,1}, \ldots, e_{l,M}$ corresponding to the eigenvalues.

$$C_l e_{l,i} = \delta_{l,i} e_{l,i} \quad (11)$$

In Equation 11, i represents an index indicating each eigenvalue and each eigenvector and the order of i is the descending order of the eigenvalues.

The target sound selecting unit 110 sequentially combines the eigenvectors $e_{l,1}, \ldots, e_{l,M}$ to generate a regular matrix $E_l$ of M rows and M columns and a diagonal matrix $\Delta_l$ of M rows and M columns in which the eigenvalues $\alpha_{l,1}, \ldots, \delta_{l,M}$ are sequentially arranged as diagonal elements.

The target sound selecting unit 110 calculates the listening matrix $C_l^{Dl}$ by performing exponentiation and scaling using the interest index $D_1$ of each sound source 1 preset for the sound source correlation matrix $C_l$. The target sound selecting unit 110 multiplies the left side of the matrix obtained by raising the diagonal matrix $\Delta_l$ to the power of interest index $D_1$ by the regular matrix $E_l$ and multiplies the right side thereof by the inverse matrix $E_l^{-1}$ of the regular matrix so as to calculate the listening matrix $C_l^{Dl}$, as expressed by Equation 12.

$$C_l^{Dl} = E_l \Delta_l^{Dl} E_l^{-1} \quad (12)$$

The target sound selecting unit 110 calculates the correlation matrix K by multiplying all the listening matrices $C_l^{Dl}$ of the sound sources 1, as expressed by Equation 13.

$$K = \prod_l C_l^{Dl} \quad (13)$$

Here, the target sound selecting unit 110 may determine the interest index $D_1$ based on the class information $\lambda$ of each sound source 1 input from the sound source identification unit 107. Thereafter, the target sound selecting unit 110 calculates the correlation matrix $K_\lambda$ using the determined interest index $D_1$.

A case where the sound source 1 is one of music and a voice uttered by a person will be described as an example of the method of determining the interest index $D_1$.

In advance, the target sound selecting unit 110 sets the identification (ID) at frame time t to $ID(t) = 1$ when the class information $\lambda_1$ of sound source 1 is music and sets the identification to $ID(t) = -1$ when the class information $\lambda_2$ is a voice.

The target sound selecting unit 110 sets the interest index $D_1$ of sound source 1 to a value obtained by dividing a value, which is obtained by subtracting the temporal average of the identification $ID(t)$ from 1, by 2 as expressed by Equation 14. Accordingly, as the identification $ID(t)$ increases from $-1$ to 1, the interest index $D_1$ decreases from 1 to 0. For example, $D_1$ is 1 when sound source 1 is music, that is, when the identification $ID(t)$ is $-1$, and $D_1$ is $-1$ when sound source 1 is a voice, that is, when the identification $ID(t)$ is 1. Accordingly, the target sound selecting unit 110 can identify that sound source 1 is a voice and the sound source localization unit 111 can calculate the sound direction information of the voice.

$$D_1 = \frac{\left(1 - \frac{\sum_{\tau=0}^{W-1} ID(t-\tau)}{W}\right)}{2} \quad (14)$$

In Equation 14, W represents a predetermined number of frames.

On the other hand, the target sound selecting unit 110 sets the interest index $D_2$ of sound source 2 to a value obtained by dividing the sum of 1 and the temporal averages of the identification ID(t) by 2, as expressed by Equation 15. Accordingly, as the identification ID(t) increases from −1 to 1, the interest index $D_2$ increases from 0 to 1. For example, $D_2$ is 0 when sound source 2 is music, that is, when the identification ID(t) is −1, and $D_2$ is 1 when sound source 2 is a voice, that is, when the identification ID(t) is 1. Accordingly, the target sound selecting unit 110 can identify that sound 2 is music and the sound source localization unit 111 can calculate the sound direction information of the music.

$$D_2 = \frac{\left(1 + \frac{\sum_{\tau=0}^{W-1} ID(t-\tau)}{W}\right)}{2} \quad (15)$$

When the number of sound sources is 1, the sound source localization unit 111 may use a noise correlation matrix $V_n$ calculated based on a noise signal as the correlation matrix $K_\lambda$. Accordingly, it is possible to calculate the sound direction information of a sound source signal uncorrelated to or low-correlated to the noise signal. For this purpose, the target sound selecting unit 110 performs a discrete Fourier transform on a multi-channel (M-channel) noise signal recorded in advance into the frequency domain to calculate the noise spectrum n. The target sound selecting unit 110 substitutes the noise spectrum n instead of the input spectrum x for Equation 1 to calculate the noise correlation matrix $V_{ii}$ for each frequency and stores the calculated noise correlation matrix $V_n$ in its own storage unit in advance. The sound source localization unit 111 reads the noise correlation matrix $V_n$ from the storage unit 110 of the target sound selecting unit 110.

The sound source localization unit 111 generates second sound direction information (secondary candidate) for each target sound based on the input correlation matrix $R_{xx}$ input from the first correlation matrix calculation unit 102 using the correlation matrix $K_\lambda$ for each target sound input from the target sound selecting unit 110.

Specifically, the sound source localization unit 111 generates position information, for example, using the GEVD-MUSIC method. Here, the sound source localization unit 111 expands generalized eigenvalues for each target sound based on the input correlation matrix $R_{xx}$ and the correlation matrix $K_\lambda$ to calculate the eigenvalues $\delta_m$ (1≤m≤M)) and the eigenvector $e_m$. The input correlation matrix $R_{xx}$, the correlation matrix $K_\lambda$, the eigenvalues $\delta_m$, and the eigenvector $e_m$ satisfy the relationship expressed by Equation 16.

$$R_{xx}e_m = \delta_m K_\lambda e_m \quad (16)$$

In Equation 16, the order of m is the descending order of the eigenvalues $\delta_m$. That is, the eigenvector $e_m$ with the smaller m means the higher degree of contribution to the input sound signal.

The sound source localization unit 111 calculates the spatial spectrum P(ϕ) as an index value based on the calculated eigenvector $e_m$ and the transfer function vector D(ϕ) read from the transfer function storage unit 103, for example, using Equation 3. Here, the sound source localization unit 111 substitutes the calculated eigenvector $e_m$ instead of the eigenvector $e_i$ for Equation 3.

The sound source localization unit 111 selects the sound direction ϕ having the largest spatial spectrum P(ϕ) and determines the selected sound direction ϕ as the second sound direction information for each target sound.

The sound source localization unit 111 outputs the determined second sound direction information for each target sound to the outside of the sound direction estimation apparatus 1.

The sound source localization unit 111 may use a GSVD (Generalized Singular Value Decomposition)-MUSIC method instead of the GEVD-MUSIC to generate the second sound direction information.

Here, the sound source localization unit 111 singularly decomposes the matrix obtained by multiplying the input correlation matrix $R_{xx}$ by the inverse matrix $K_\lambda^{-1}$ of the correlation matrix $K_\lambda$ so as to satisfy Equation 17, and calculates a left unitary matrix $E_{left}$, a singular value matrix $\Sigma$, and a right unitary matrix $E_{right}$.

$$K_\lambda^{-1} R_{xx} = E_{left} \Sigma E_{right} \quad (17)$$

The singular value matrix $\Sigma$ is a matrix having zero as off-diagonal elements and including and singular values $\sigma_{s,ii}$, which are non-negative values, as diagonal elements. In the singular value matrix $\Sigma$, the order of row or column numbers i of the singular values $\sigma_{s,ii}$ is the descending order of the values $\sigma_{s,ii}$. The left unitary matrix $E_{left}$ includes singular vectors $e_{sl,i}$ corresponding to the singular values $\sigma_{s,ii}$ as elements of each row i. The right unitary matrix $E_{right}$ includes singular vectors $e_{sr,i}$ corresponding to the singular values $\sigma_{s,ii}$ as elements of each column i. The singular vectors $\sigma_{sl,i}$ and $e_{sr,i}$ are orthogonal to each other.

The sound source localization unit 111 calculates the spatial spectrum P(ϕ) as an index value based on the calculated singular vectors $e_{s,i}$ and the transfer function vectors D(ϕ) corresponding to the sound directions ϕ read from the transfer function storage unit 103, for example, using Equation 3. Here, the sound source localization unit 111 substitutes the calculated singular vectors $e_{sl,i}$ instead of the eigenvector $e_i$ for Equation 3.

The sound source localization unit 111 selects the sound direction ϕ having the largest spatial spectrum P(ϕ) and determines the selected sound direction ϕ as the second sound direction information.

The sound source localization unit 111 outputs the determined second sound direction information to the outside of the sound direction estimation apparatus 1.

Although it has been described that the sound source localization unit 111 calculates the spatial spectrum P(ϕ) using the singular vectors $e_{sl,i}$ which are the elements of the left unitary matrix $E_{left}$, the spatial spectrum P(ϕ) may be calculated using the singular vectors $e_{sr,i}$ which are the elements of the right unitary matrix $E_{right}$.

Since the singular vectors are orthogonal to each other, it is possible to more satisfactorily separate the components of the sound sources input from different directions by the directions ϕ using the spatial spectrum P(ϕ) as an index value, compared with the case where the eigenvectors $e_m$ of which the orthogonality is not guaranteed are used. Accordingly, the sound source localization unit 111 can improve the estimation precision of the sound direction using the GSVD-MUSIC.

In order to generate the second sound direction information, the sound source localization unit 111 may use a spatial spectrum to which an audio-sense correction has been applied instead of a spatial spectrum calculated using the aforementioned GEVD-MUSIC method or GSVD-MUSIC method. The sound source localization unit 111 selects sound directions ϕ each of which maximizes a corrected spatial spectrum Pw(ϕ), and determines each of the selected sound directions ϕ to be a second sound direction information for each of the target sound sources.

In order to perform the audio-sense correction, the sound source localization unit 111 calculates an A-weighted spatial spectrum Pw(φ) in which an A-weighting characteristics are added to the spatial spectrum P(φ) using, for example, Equation 18. The A-weighting characteristics represent the frequency characteristics of the audio sense of human being with respect to noise, and are defined as standard characteristics (IEC 61672: 2003) at the IEC (International Electrotechnical Commission). Because the standard characteristics are defined in discrete values, the sound source localization unit 111 calculates A-weighting coefficients W(ω) beforehand using a spline interpolation.

$$P_W(\phi) = 10^{\frac{W(\omega)}{20}} P(\phi) \quad (18)$$

In Equation 18, the A-weighting coefficient W(w) is expressed in decibel (dB) while the spatial spectrum P(φ) is expressed in linear scale.

Accordingly, the sound source localization unit 111 estimates the sound directions with more weights at the frequency band components at which the audio sense of human being is highly sensitive. For example, low frequency band components of 200 Hz or lower are suppressed. Therefore, diffusive noise which remains mainly in the low frequency band components is suppressed. As a result, the sound source localization unit 111 can estimate the sound directions with high precision while avoiding effects of, for example, diffusive noise.

Similarly, the sound source localization unit 104 may estimate the first sound direction information for each of the sound sources using a corrected spatial spectrum P(φ) in which an audio-sense correction has been applied to the spatial spectrum P(φ) that is calculated using Equation 3.

The sound direction estimating process performed by the sound direction estimation apparatus 1 according to this embodiment will be described.

Figure 4:
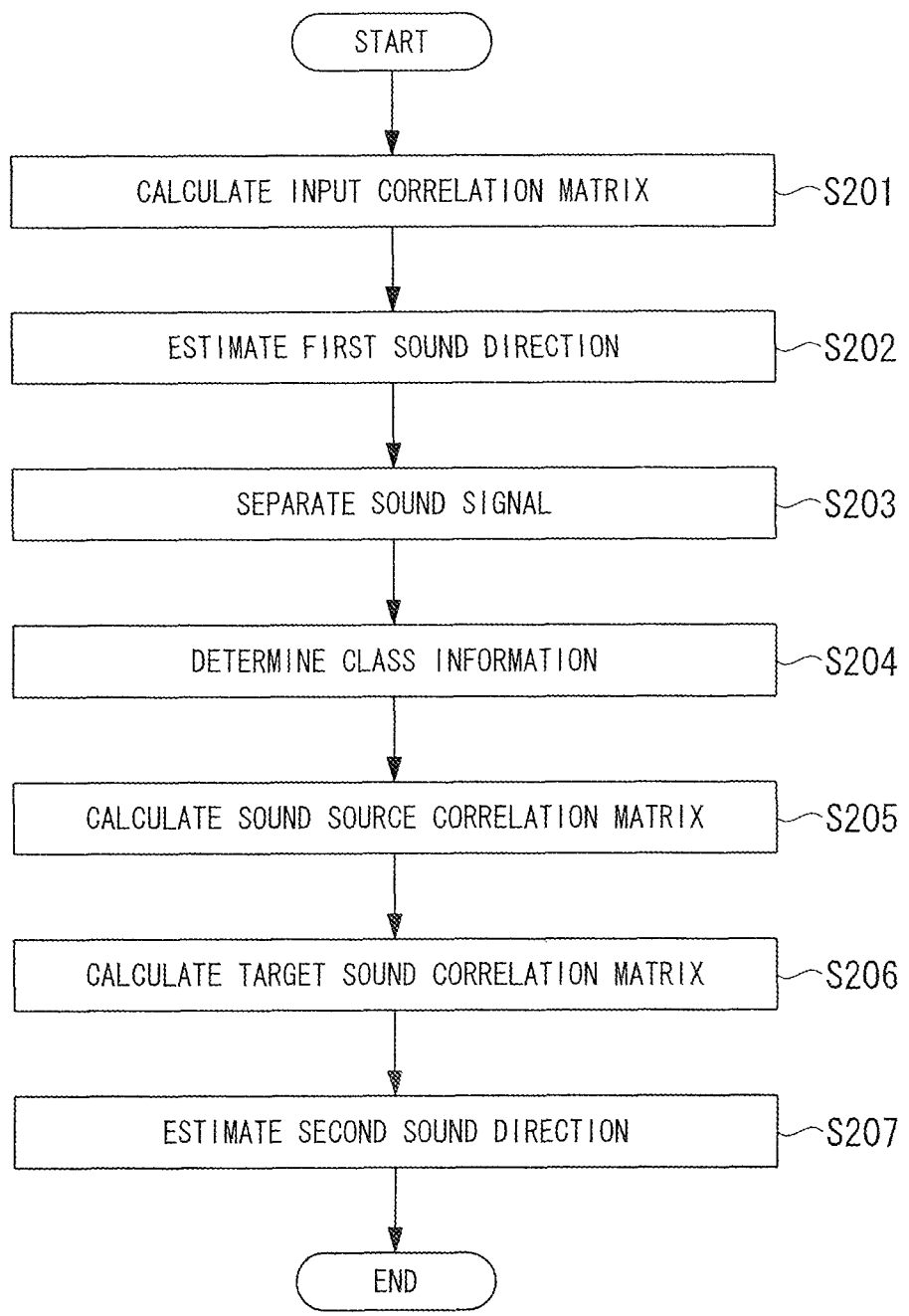
FIG. 4 is a flowchart illustrating a sound direction estimating process according to the first embodiment of the invention.

FIG. 4 is a flowchart illustrating the sound direction estimating process according to this embodiment.

(Step S201) The first correlation matrix calculation unit 102 transforms the sound signals in the time domain of the channels constituting an input multi-channel sound signal into the frequency domain and calculates the input spectrum x for each frequency.

The first correlation matrix calculation unit 102 calculates the input correlation matrix $R_{xx}$ for each frequency based on the calculated input spectrum x, for example, using Equation 1.

The first correlation matrix calculation unit 102 outputs the calculated input correlation matrix $R_{xx}$ to the sound source localization unit 104 and the sound source localization unit 111. Thereafter, the process of step S202 is performed.

(Step S202) The sound source localization unit 104 estimates the first sound direction information for each sound source based on the input correlation matrix $R_{xx}$ input from the first correlation matrix calculation unit 102, for example, using the MUSIC method.

The sound source localization unit 104 outputs the estimated sound direction information to the sound source separation unit 105. Thereafter, the process of step S203 is performed.

(Step S203) The sound source separation unit 105 separates the sound signal $s_l$ for each sound source 1 from the multi-channel sound signal input from the sound input unit 101 based on the input sound direction information.

The sound source separation unit 105 outputs the separated sound signal $s_l$ for each sound source 1 to the sound source identification unit 107 and the second correlation matrix calculation unit 108. The sound source separation unit 105 outputs the input sound direction information to the second correlation matrix calculation unit 108. Thereafter, the process of step S203 is performed.

(Step S204) The sound source identification unit 107 determines the class information $\lambda_1$ indicating the class of each sound source 1 based on the sound signal $s_l$ input from the sound source separation unit 105, for example, using the hierarchical Gaussian mixture model information stored in advance in the sound source model storage unit 106.

The sound source identification unit 107 outputs the determined class information $\lambda_1$ to the target sound selecting unit 110. Thereafter, the process of step S205 is performed.

(Step S205) The second correlation matrix calculation unit 108 calculates the sound source correlation matrix $V_l$ for each sound 1 based on the sound signal $s_l$ and the sound direction information input from the sound source separation unit 105 and outputs the calculated sound source correlation matrix $V_l$ to the target sound selecting unit 110. Thereafter, the process of step S206 is performed.

(Step S206) The target sound selecting unit 110 calculates the correlation matrix $K_\lambda$ for each target sound based on the correlation matrix $V_l$ for each sound source 1 input from the second correlation matrix calculation unit 108 and the class information λ (the sound source class) of each sound source 1 input from the sound source identification unit 107, for example, using Equation 7. The target sound selecting unit 110 outputs the calculated correlation matrix $K_\lambda$ to the sound source localization unit 111. Thereafter, the process of step S207 is performed.

(Step S207) The correlation matrix $K_\lambda$ for each target sound from the target sound selecting unit 110 and the input correlation matrix $R_{xx}$ from the first correlation matrix calculation unit 102 are input to the sound source localization unit 111. The sound source localization unit 111 generates the second sound direction information (secondary candidate) for each target sound based on the correlation matrix $K_\lambda$ for each target sound and the input correlation matrix $R_{xx}$, for example, using the GEVD-MUSIC method.

The sound source localization unit 111 outputs the generated second sound direction information to the outside of the sound direction estimation apparatus 1. Thereafter, the flow of processes is ended.

The operation verification result of the sound direction estimation apparatus 1 according to this embodiment will be described.

In first verification, microphones of the sound input unit 101 are disposed in the head part of a humanoid robot. A stationary speaker (sound source) is disposed on the front side (0°) of the robot and sound source signals of plural classes are sequentially reproduced every 2 to 7 seconds. The sound source signals of plural classes include a female voice, jazz music, door sound, classical music, operation sound of an electrical cleaner, and a male voice.

The sound source model storage unit 106 stores the GMM hierarchical relationship information in which the highest hierarchy (hierarchy information) $\Lambda_1$ has class information $\lambda_1$ indicating sound as root information and which includes class information $\lambda_{11}$ indicating a voice and class information $\lambda_{12}$ indicating music as sub class information.

An example of the sound source identification result according to this embodiment will be described below.

Figure 5:
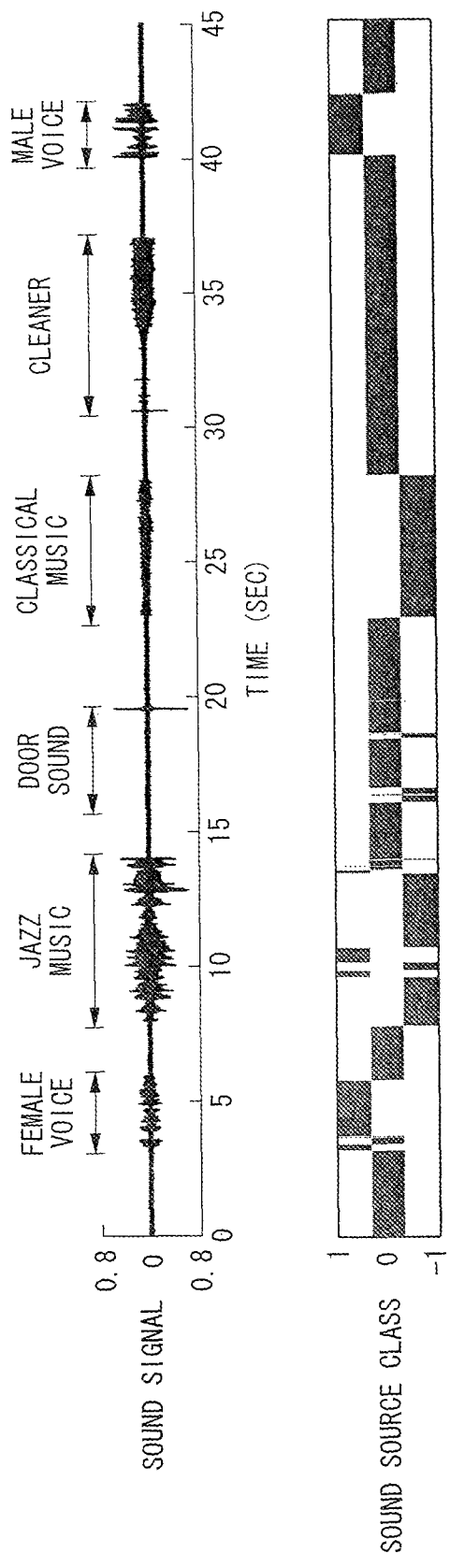
FIG. 5 is a diagram illustrating an example of a sound identification result according to the first embodiment of the invention.

FIG. 5 is a diagram illustrating an example of the sound source identification result according to this embodiment.

In the upper and lower parts of FIG. 5, the horizontal axis represents the time (sec). In the upper part of FIG. 5, the vertical axis represents the amplitude of an input sound signal. In the lower part of FIG. 5, the vertical axis represents the value indicating the identified sound source class. The value 1 indicates a voice uttered by a person, the value −1 indicates music, and the value 0 indicates others.

FIG. 5 shows that a female voice is input from time 2.8 sec to time 6.3 sec and the sound source identification unit 107 determines that the input sound during this time frame is substantially a voice. FIG. 5 shows that jazz music is input from time 7.8 sec to time 14.4 sec and the sound source identification unit 107 determines that the input sound during this time frame is substantially music. FIG. 5 shows that door sound is input from time 15.7 sec to time 19.8 sec and the sound source identification unit 107 determines that the input sound during this time frame is others. FIG. 5 shows that classical music is input from time 23.0 sec to time 28.1 sec and the sound source identification unit 107 determines that the input sound during this time frame is music. FIG. 5 shows that working sound of a cleaner is input from time 30.4 sec to time 37.5 sec and the sound source identification unit 107 determines that the input sound during this time frame is others. FIG. 5 shows that a male voice is input from time 39.9 sec to time 42.4 sec and the sound source identification unit 107 determines that the input sound during this time frame is a voice. As a result, in this embodiment, it is possible to satisfactorily identify the class of a sound source of an input sound signal.

In second verification, similarly to the first verification, the sound input unit 101 is disposed in the head part of a humanoid robot, a female voice is reproduced on the front-left side (60°) of the robot, jazz music is reproduced in the front side (0°) thereof, and a male voice is reproduced on the front-right side)(−60°. The sound sources are made to be stationary.

An example of the sound source identification result according to this embodiment will be described.

Figure 6:
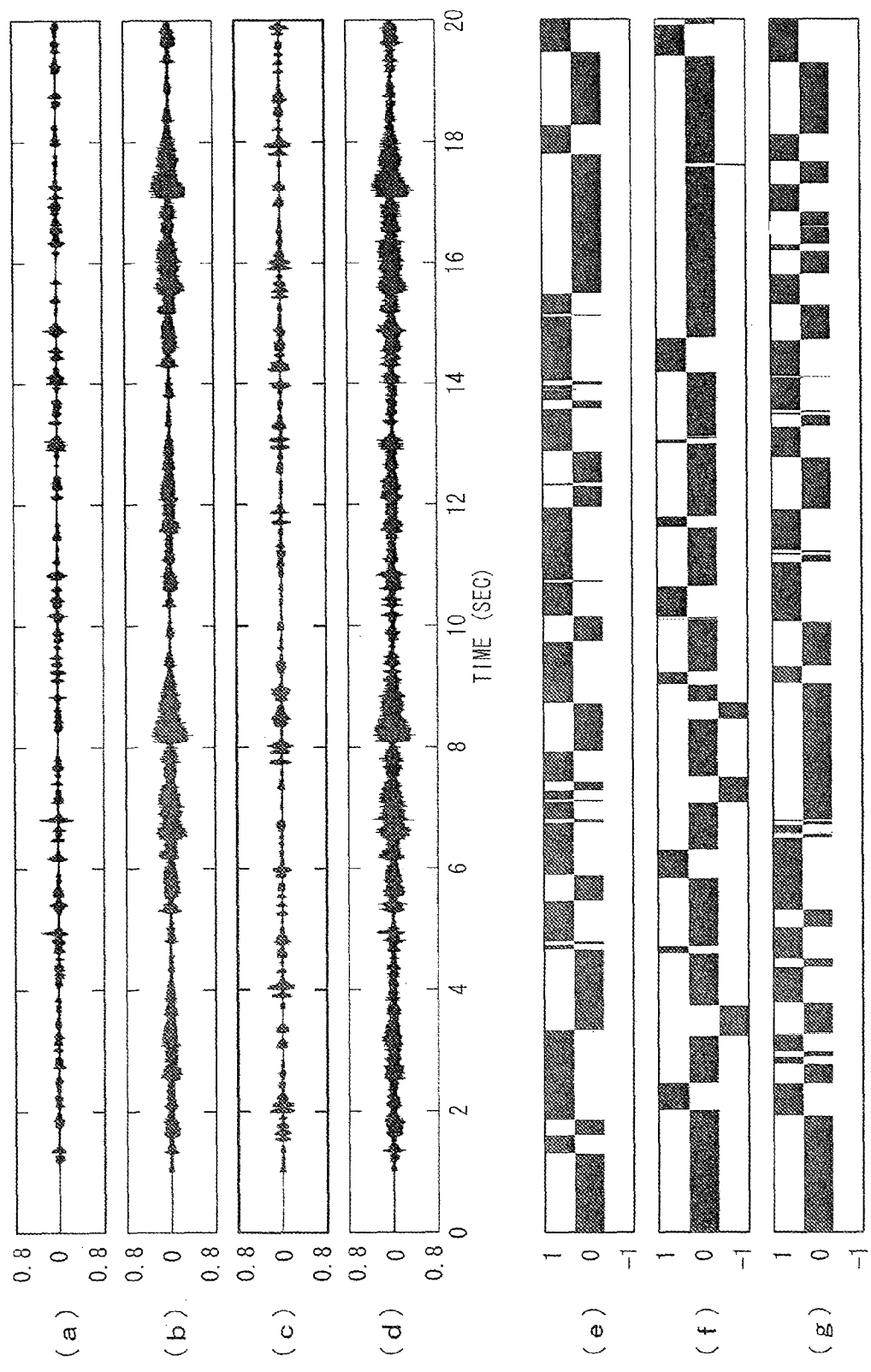
FIG. 6 is a diagram illustrating another example of the sound identification result according to the first embodiment of the invention.

FIG. 6 is a diagram illustrating another example of the sound source identification result according to this embodiment.

In FIG. 6, part (a), i.e., a sound signal acquired by extracting the female voice, part (b), i.e., a sound signal acquired by extracting the jazz music, part (c), i.e., a sound signal acquired by extracting the male voice, part (d), i.e., an input signal, part (e), i.e., the identification result of the signal shown in part (a), part (f), i.e., the identification result of the signal shown in part (b), and part (g), i.e., the identification result of the signal shown in part (c), are shown sequentially from the uppermost.

In part (a) to part (g) of FIG. 6, the horizontal axis represents the time (sec). In part (a) to part (d) of FIG. 6, the vertical axis represents the amplitude of the sound signal. In part (e) to part (f) of FIG. 6, the vertical axis represents the class of the identified sound source. A value of 1 indicates a voice, a value of −1 indicates music, and a value of 0 indicates others.

It is shown in part (e) and part (g) of FIG. 6 that the input sound is identified to have a value of 1 or 0, that is, to be music or others, based on the sound signals shown in part (a) and part (c) and is not erroneously recognized as a voice. However, it is shown in part (f) of FIG. 6 that the input sound is identified to be a value 1 other than −1 or 0 based on the sound signal shown in part (b), that is, that the input sound is erroneously recognized as music.

An example of an estimated sound direction according to this embodiment will be described.

Figure 7:
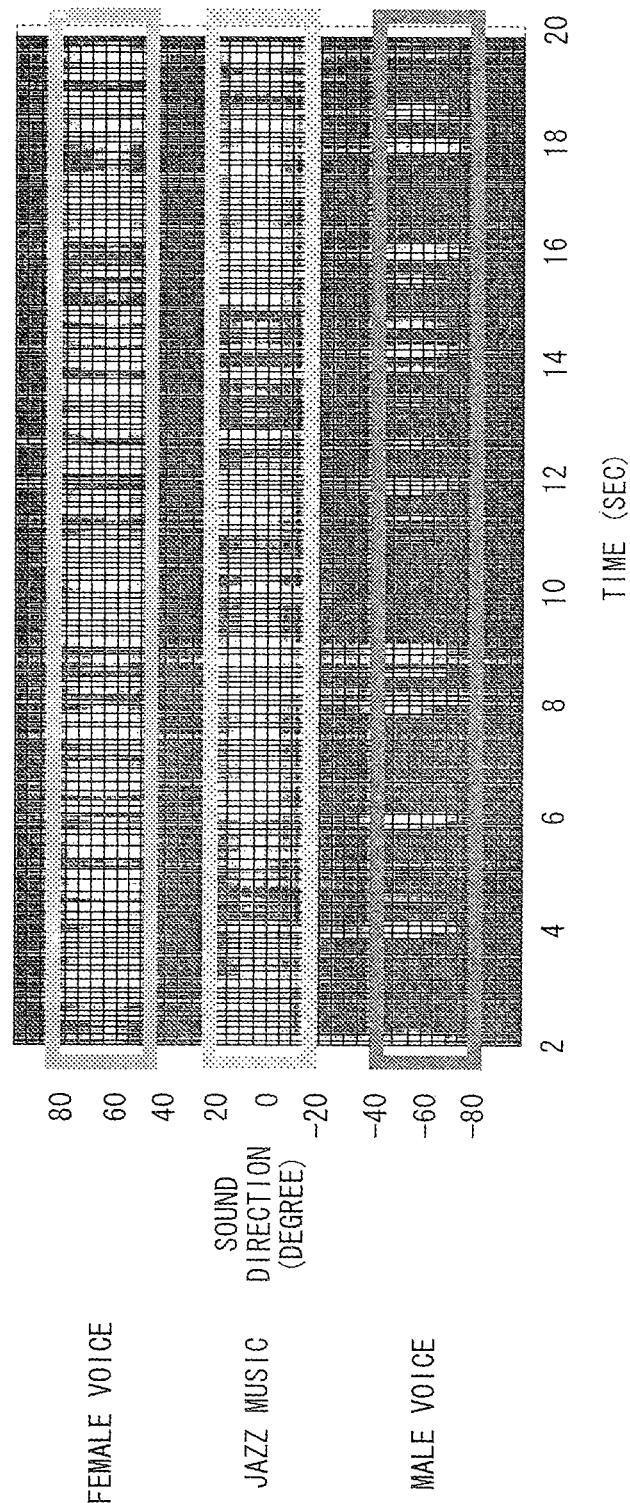
FIG. 7 is a diagram illustrating an example of estimated sound directions according to the first embodiment of the invention.

FIG. 7 is a diagram illustrating an example of an estimated sound direction according to this embodiment.

In FIG. 7, the vertical axis represents the sound direction (degree) and the horizontal axis represents the time (sec). The shading in FIG. 7 indicates the power of the sound signal of each sound source, a dark portion means smaller power, and a bright portion means greater power.

FIG. 7 shows that portions brighter than the surroundings are distributed in the sound direction of 60° or −60°. As a result, it can be seen that the sound source separation unit 105 can separate the male voice and the female voice well, the sound source identification unit 107 can identify the classes of the sound sources, and the sound source localization unit 111 can estimate the sound directions with high precision.

However, in the vicinity of the sound direction of 0° in FIG. 7, only dark portions are distributed but portions brighter than the surroundings are not distributed. As a result, it can be seen that the sound signal of jazz music is not sufficient, which is a factor making it insufficient to identify the sound source class of jazz music.

In this manner, according to an aspect of this embodiment, the likelihood of the sound source classes are stored in correspondence with the sound feature quantities, the sound source class of an input sound signal is identified, and the sound direction of the sound signal of the identified class is estimated. Accordingly, it is possible to simultaneously estimate the sound source class and the sound direction of the input sound signal.

According to another aspect of this embodiment, the sound direction of a sound signal input from the sound signal input unit is estimated, the signal input from the sound input unit is separated into sound signals of the sound sources based on the estimated sound direction, and the sound directions of the separated sound signals are estimated. Accordingly, since a sound signal from the primarily-estimated sound direction is extracted and the final sound direction of the extracted sound signal is estimated, it is possible to estimate the sound direction of each sound source with high precision.

According to another aspect of the invention, the correlation functions of the separated sound signals are calculated, and the sound directions of the separated sound signals are estimated based on the calculated correlation matrix and the correlation matrix of the input sound signal. Accordingly, it is possible to estimate the sound direction of a sound source with high precision by paying attention to the components of the target sound source.

Second Embodiment

Hereinafter, a second embodiment of the invention will be described with reference to the accompanying drawings.

Figure 8:
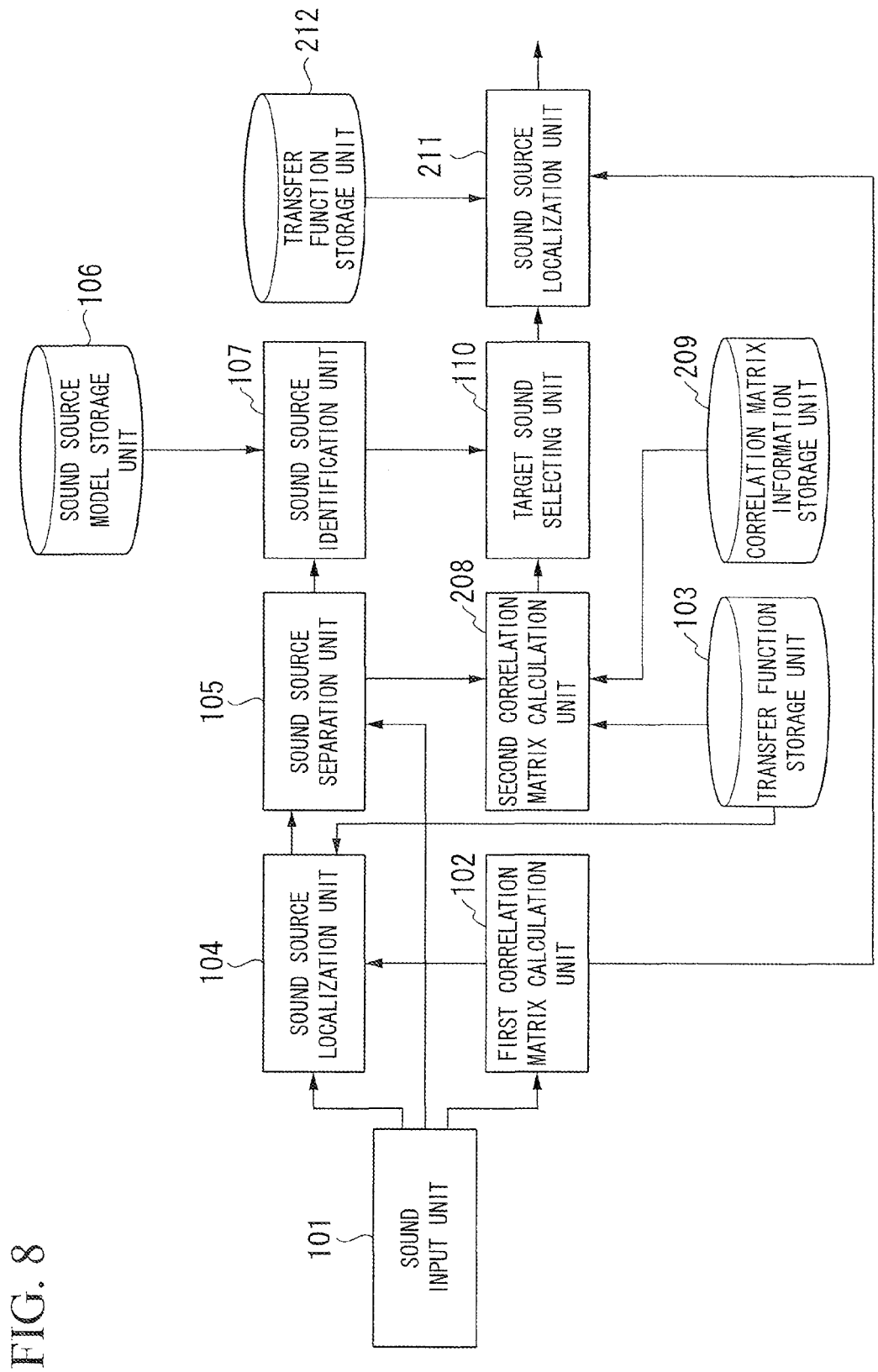
FIG. 8 is a diagram schematically illustrating the configuration of a sound direction estimation apparatus according to a second embodiment of the invention.

FIG. 8 is a diagram schematically illustrating the configuration of a sound direction estimation apparatus 2 according to the second embodiment of the invention.

The sound direction estimation apparatus 2 includes a sound input unit 101, a first correlation matrix calculation unit 102, a transfer function storage unit 103, a sound source localization unit 104, a sound source separation unit 105, a sound source model storage unit 106, a sound source identification unit 107, a second correlation matrix calculation unit 208, a correlation matrix information storage unit 209, a target sound selecting unit 110, a sound source localization unit 211, and a transfer function storage unit 212.

That is, the sound direction estimation apparatus 2 is different from the sound direction estimation apparatus 1 shown in FIG. 1, in that the second correlation matrix calculation unit 208 and the sound source localization unit 211 are disposed instead of the second correlation matrix calculation unit 108 and the sound source localization unit 111 and the correlation matrix information storage unit 209 and the transfer function storage unit 212 are further provided. Hereinafter, the differences from the sound direction estimation apparatus 1 will be mainly described and the common points to the sound direction estimation apparatus 1 will not be repeated.

In this configuration, the second correlation matrix calculation unit 208 interpolates the sound source correlation matrix $V_l$ of the corresponding sound sources 1 between two discrete sound directions $\phi_{l1}$ and $\phi_{l2}$ interposing the sound direction $\phi_l$ indicated by the sound direction information input from the sound source separation unit 105. The target sound selecting unit 110 calculates the correlation matrix $K_\lambda$ of each class using the interpolated sound source correlation matrix $V_l$. The sound source localization unit 211 calculates the sound direction information based on the calculated correlation matrices $K_\lambda$ using the calculated eigenvectors. Accordingly, in this embodiment, it is possible to calculate the sound direction information indicating continuous sound directions. The configurations and processes of the units will be described below.

The second correlation matrix calculation unit 208 calculates the sound source correlation matrix $V_l$ of each sound source 1 based on the sound signal $s_l$ input from the sound source separation unit 105 and the sound direction information, and outputs the calculated sound source correlation matrix $V_l$ to the target sound selecting unit 110. The second correlation matrix calculation unit 208 performs a discrete Fourier transform on the sound signal $s_l$ input from the sound source separation unit 105 into the frequency domain to calculate a spectrum $S_l$. The second correlation matrix calculation unit 208 is similar to the second correlation matrix calculation unit 108 of the first embodiment in this point.

The second correlation matrix calculation unit 208 is different from the second correlation matrix calculation unit 108, in performing an interpolation process on the square matrix $A(\phi_1)$ and the like and calculating the sound source correlation matrix $V_l$ based on the interpolated matrix.

The second correlation matrix calculation unit 208 performs, for example, an M-EVSI (Multiplication-based eigenvalue scaling interpolation) to interpolate the square matrix $A(\phi_1)$.

As the premise of the interpolation using the M-EVSI method, the second correlation matrix calculation unit 208 performs the following process on the transfer function vector $D(\phi_1)$ to calculate the correlation matrix information of each sound direction $\phi_1$, that is, the square matrix $A(\phi_1)$, the regular matrix $E_M(\phi_1, \phi_2)$, and the diagonal matrix $\Delta_M(\phi_1, \phi_2)$. The second correlation matrix calculation unit 208 stores the calculated correlation matrix information in the correlation matrix information storage unit 209 in advance. Here, $\phi_2$ represents a sound direction stored in the transfer function storage unit 103 and adjacent to $\phi_1$. The correlation matrix information calculating process will be described below.

Figure 9:
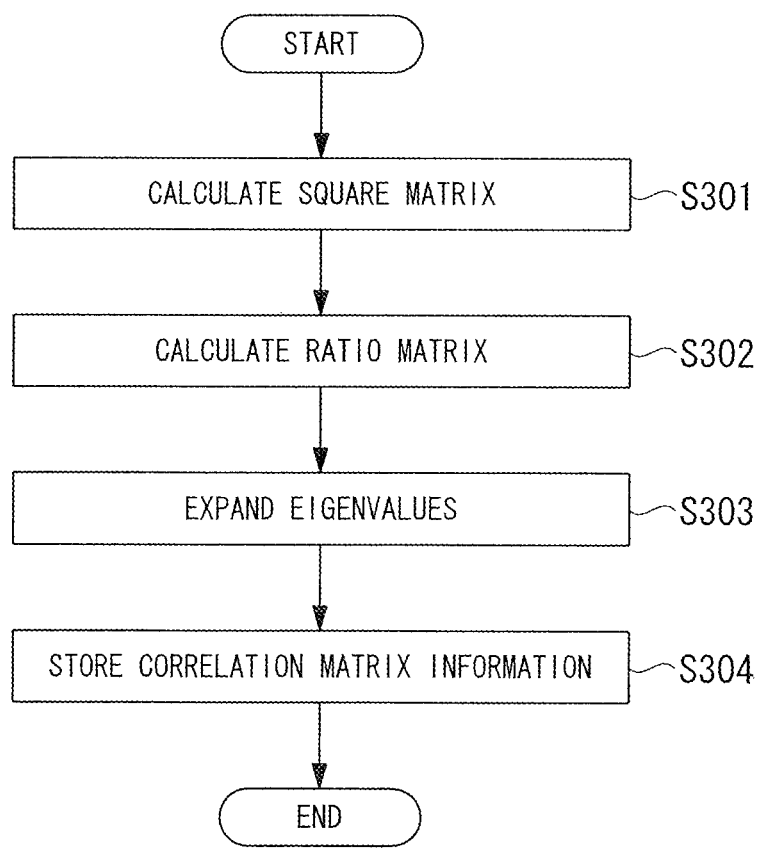
FIG. 9 is a flowchart illustrating an example of a correlation matrix information calculating process according to the second embodiment of the invention.

FIG. 9 is a flowchart illustrating an example of the correlation matrix information calculating process according to this embodiment.

(Step S301) The second correlation matrix calculation unit 208 reads the transfer function vector $D(\phi_1)$ of each sound direction $\phi_1$ from the transfer function storage unit 103 and multiplies the read transfer function vector $D(\phi_1)$ by the complex conjugate transpose vector $D^*(\phi_1)$ to calculate the square matrix $D(\phi_1)D^*(\phi_1)$ (also referred to as square matrix $A(\phi_1)$). Thereafter, the process of step S302 is performed.

(Step S302) The second correlation matrix calculation unit 208 multiplies the square matrix $A_1(\phi_1)$ of each sound direction $\phi_1$ by the inverse matrix $A_2^{-1}(\phi_2)$ of the square matrix $A_2(\phi_2)$ of another sound direction $\phi_2$ adjacent to the sound direction $\phi_1$ to calculate the ratio matrix $A_M(\phi_1, \phi_2)$ of the square matrix $A_1(\phi_1)$ of the sound direction $\phi_1$ to the square matrix $A_2(\phi_2)$ of the adjacent sound direction $\phi_2$. Thereafter, the process of step S303 is performed.

(Step S303) The second correlation matrix calculation unit 208 expands the eigenvalues of the ratio matrix $A_M(\phi_1, \phi_2)$ to calculate the regular matrix $E_M(\phi_1, \phi_2)$ and the diagonal matrix $\Delta_M(\phi_1, \phi_2)$ satisfying Equation 19. Thereafter, the process of step S303 is performed.

$$A_M(\phi_1,\phi_2)=E_M(\phi_1,\phi_2)\Delta_M(\phi_1,\phi_2)E_M^{-1}(\phi_1,\phi_2) \quad (19)$$

(Step S304) The second correlation matrix calculation unit 208 stores the calculated square matrix $A_1(\phi_1)$ of the sound direction $\phi_1$ and the regular matrix $E_M(\phi_1, \phi_2)$ and the diagonal matrix $\Delta_M(\phi_1, \phi_2)$ of the sound direction $\phi_1$ and the sound direction $\phi_2$ adjacent thereto in the correlation matrix information storage unit 209. Thereafter, the flow of the process is ended.

The process, which is performed by the second correlation matrix calculation unit 208, of interpolating the regular matrix based on the square matrix $A_1(\phi_1)$, the regular matrix $E_M(\phi_1, \phi_2)$, and the diagonal matrix $\Delta_M(\phi_1, \phi_2)$ stored in the correlation matrix information storage unit 209 using the M-EVSI method will be described.

Figure 10:
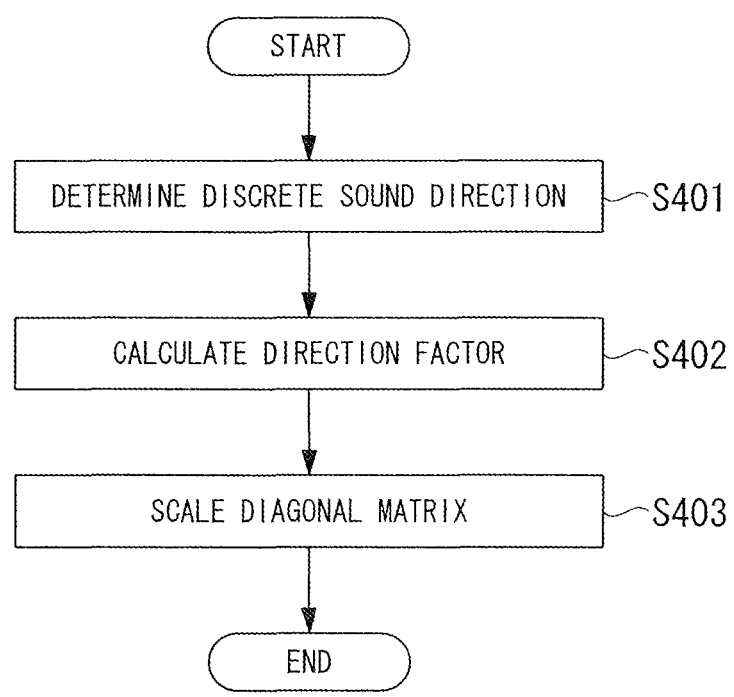
FIG. 10 is a flowchart illustrating an example of a square matrix interpolating process according to the second embodiment of the invention.

FIG. 10 is a flowchart illustrating an example of the square matrix interpolating process according to this embodiment.

(Step S401) The second correlation matrix calculation unit 208 determines a first sound direction $\phi_{1l}$ and a second sound direction $\phi_{2l}$ interposing the input sound direction $\phi_l$ indicated by the sound direction information therebetween. The first sound direction $\phi_{1l}$ and the second sound direction $\phi_{2l}$ are one of the sound directions stored in the transfer function storage unit 103 and the correlation matrix information storage unit 209. The first sound direction $\phi_{1l}$ is a sound direction closest to the input sound direction $\phi_l$ out of the sound directions smaller than the input sound direction $\phi_l$. The second sound direction $\phi_{2l}$ is a sound direction closest to the input sound direction $\phi_l$ out of the sound directions greater than the input sound direction $\phi_l$. Thereafter, the process of step S402 is performed.

(Step S402) The second correlation matrix calculation unit 208 calculates a direction factor $D_A$ indicating a ratio of the distance from the first sound direction $\phi_{1l}$ to the second sound direction $\phi_{2l}$ to the distance to the input sound direction $\phi_l$ from the first sound direction $\phi_{1l}$. $D_A$ is a real value of 0 to 1 and is a value indicating that the input sound direction $\phi_l$ is closer to the second sound direction $\phi_{2l}$ than the first sound direction $\phi_{1l}$ as $D_A$ increases. For example, the input sound direction $\phi_l$ is the first sound direction $\phi_{1l}$ when $D_A=0$, and the input sound direction $\phi_l$ is the second sound direction $\phi_{2l}$ when $D_A=1$. Thereafter, the process of step S403 is performed.

(Step S403) The second correlation matrix calculation unit 208 reads the square matrix $A(\phi_{2l})$ corresponding to the second sound direction $\phi_{2l}$ and the regular matrix $E_M(\phi_{1l}, \phi_{2l})$ and the diagonal matrix $\Delta_M(\phi_{1l}, \phi_{2l})$ corresponding to the first sound direction $\phi_{1l}$ and the second sound direction $\phi_{2l}$ adjacent thereto from the correlation matrix information storage unit 209.

As expressed by Equation 20, the second correlation matrix calculation unit 208 calculates the square matrix $A_1(\phi_1)$ of the input sound direction $\phi_1$ by multiplying the left side of the matrix $\Delta_M^{D_A}(\phi_{1l}, \phi_{2l})$, which is scaled by raising the diagonal matrix $\Delta_M(\phi_{l1}, \phi_{2l})$ to the power of direction factor $D_A$, by the regular matrix $E_M(\phi_{1l}, \phi_{2l})$ and the square matrix $A(\phi_{2l})$ and multiplying the right side the multiplied matrix by the inverse matrix $E_M^{-1}(\phi_{1l}, \phi_{2l})$ of the regular matrix $E_M(\phi_{1l}, \phi_{2l})$. Thereafter, the process flow is ended.

$$A(\phi_l)=A(\phi_{2l})E_M(\phi_{1l},\phi_{2l})\Delta_m^{D_A}(\phi_{1l},\phi_{2l})E_M^{-1}(\phi_{1l},\phi_{2l}) \quad (20)$$

According to Equation 20, the phase of the square matrix A($\phi_l$) is smoothly interpolated so that the square matrix A($\phi_l$) is the square matrix A($\phi_{l1}$) of the sound direction $\phi_{l1}$ when $D_A=0$ and the square matrix A($\phi_l$) is the square matrix $A_1(\phi_{l2})$ of the sound direction $\phi_{l2}$ when $D_A=1$.

Alternatively, the second correlation matrix calculation unit 208 may perform the square matrix interpolating process using an S-EVSI (Subtraction-based Eigenvalue Scaling Interpolation) instead of the M-EVSI method.

When the S-EVSI method is used, the second correlation matrix calculation unit 208 expands the eigenvalues of the square matrix A($\phi$) to calculate a regular matrix $E_\phi(\phi)$ and a diagonal matrix $\Delta_\phi(\phi)$ for each sound direction $\phi$ in advance. The second correlation matrix calculation unit 208 stores the calculated regular matrix $E_\phi(\phi)$ and the calculated diagonal matrix $\Delta_\phi(\phi)$ as the correlation matrix information in the correlation matrix information storage unit 209.

The second correlation matrix calculation unit 208 performs the processes of steps S401 and S402 and then reads the regular matrix $E_\phi(\phi_{l1})$ and the diagonal matrix $\phi_\phi(\phi_{l1})$ of the sound direction $\phi_{l1}$ and the regular matrix $E_\phi(\phi_{l2})$ and the diagonal matrix $\Delta_\phi(\phi_{l2})$ of the sound direction $\phi_{l2}$ from the correlation matrix information storage unit 209.

The second correlation matrix calculation unit 208 calculates the square matrix $\Delta(\phi_1)$ based on the regular matrices $E_\phi(\phi_{l1})$ and $E_\phi(_{l2})$ and the diagonal matrices $\Delta_\phi(\phi_{l1})$ and $\Delta_\phi(\phi_{l2})$, as expressed by Equation 21.

$$A(\phi_l) = E_\phi(\phi_{1l})\Delta_\phi^{D_A}(\phi_{1l})E_\phi^{-1}(\phi_{1l}) + E_\phi(\phi_{2l})\Delta_\phi^{1-D_A}(\phi_{2l}) E_\phi^{-1}(\phi_{2l}) - I \quad (21)$$

In Equation 21, the first term is a matrix obtained by multiplying the left side of the matrix, which is scaled by raising the diagonal matrix $\Delta_\phi(\phi_{l1})$ to the power of direction factor $D_A$, by the regular matrix $E_\phi(\phi_{l1})$ and multiplying the right side of the resultant matrix by the inverse matrix $E_\phi^{-1}(\phi_{l1})$ of the regular matrix $E_\phi(\phi_{l1})$. The second term is a matrix obtained by multiplying the left side of the matrix, which is scaled by raising the diagonal matrix $\Delta_\phi(\phi_{l2})$ to the power of difference $1-D_A$ between 1 and $D_A$, by the regular matrix $E_\phi(\phi_{l2})$ and multiplying the right side of the resultant matrix by the inverse matrix $E_\phi^{-1}(\phi_{l2})$ of the regular matrix $E_\phi(\phi_{l2})$. I is a unit matrix of M rows and M columns. According to this method, the square matrix $A(\phi_1)$ of the sound direction $\phi_1$ is smoothly interpolated in amplitude between the square matrix $A(\phi_{l1})$ and the square matrix $A(\phi_{l2})$.

Alternatively, the second correlation matrix calculation unit 208 may perform the square matrix interpolating process using a difference-based FDLI (Frequency Domain Linear Interpolation) instead of the above-mentioned interpolation methods.

When the FDLI method is used, it is not necessary to store the correlation matrix information in the correlation matrix information storage unit 209.

The second correlation matrix calculation unit 208 performs the processes of steps S401 and S402 and then reads the transfer function $D(\phi_{l1})$ of the sound direction $\phi_{l1}$ and the transfer function $D(\phi_{l2})$ of the sound direction $\phi_{l2}$ from the transfer function storage unit 103.

As expressed by Equation 22, the second correlation matrix calculation unit 208 calculates the transfer function vector $D(\phi_1)$ of the sound direction $\phi_1$ by weighting the transfer function vector $D(\phi_{l1})$ and the transfer function vector ($\phi_{l2}$) with the direction factors $D_A$ and $1-D_A$, respectively.

$$D(\phi_l) = D_A D(\phi_{l1}) + (1-D_A)D(\phi_{l2}) \quad (22)$$

The second correlation matrix calculation unit 208 calculates the square matrix $A(\phi_1)$ by multiplying the calculated transfer function vector $D(\phi_1)$ by the complex conjugate transpose vector $D^*(\phi_1)$ thereof.

According to this method, the square matrix $A(\phi_1)$ of the sound direction $\phi_1$ is smoothly interpolated in amplitude in the frequency domain between the square matrix $A(\phi_{l1})$ and the square matrix $A(\phi_{l2})$.

Alternatively, the second correlation matrix calculation unit 208 may perform the square matrix interpolating process using a TDLI (Time Domain Linear Interpolation) instead of the above-mentioned interpolation methods.

When the TDLI is used, it is not necessary to store the correlation matrix information in the correlation matrix information storage unit 209. However, the transfer function storage unit 103 stores a transfer function $a(t, \phi)$ in the time domain, a geometric weight $k_\phi(\phi)$, a geometrically-delayed weight $d_\phi(\phi)$ for each sound direction $\phi$ in advance. Here, t represents the sampling time. The transfer function vector $a(t, \phi)$ is a vector including the transfer functions in the time domain obtained by performing the inverse discrete Fourier transform (IDFT) on the transfer function vector $D(\phi)$ as elements. The geometric weight $k_\phi(\phi)$ is a value normalized with a predetermined value as an amplitude damping with the propagation from a sound source in the direction $\phi$ to the sound input elements. The geometrically-delayed time $d_\phi(\phi)$ is a time delayed with the propagation from the sound source in the direction $\phi$ to the sound input elements.

The second correlation matrix calculation unit 208 performs the processes of steps S401 and S402 and then reads the transfer function vector $a(t, \phi_{l1})$ in the time domain, the geometric weight $k_\phi(\phi_{l1})$, and the geometrically-delayed time $d_\phi(\phi_{l1})$ for the sound direction $\phi_{l1}$ and the transfer function vector $a(t, \phi_{l2})$ in the time domain, the geometric weight $k_o(\phi_{l2})$, and the geometrically-delayed time $d_o(\phi_{l2})$ for the sound direction $\phi_{l2}$ from the correlation matrix information storage unit 209.

The second correlation matrix calculation unit 208 weights the transfer function vectors $a(t, \phi_{l1})$ and $a(t, \phi_{l2})$ with the geometric weights $k_\phi(\phi_{l1})$ and $k_o(\phi_{l2})$, respectively, sums the resultants and calculates the transfer function vector $a(t+d_\phi(\phi_1), \phi_1)$ in the time domain for the sound direction $\phi$ (see Equation 23). Here, the geometrically-delayed time $d_\phi(\phi_1)$ is a value obtained by weighting and summing the geometrically-delayed times $d_\phi(\phi_{l1})$ and $d_\phi(\phi_{l2})$ with the geometric weights $k_\phi(\phi_{l1})$ and $k_\phi(\phi_{l2})$ (see Equation 24).

$$a(t+d_\varphi(\varphi), \varphi) = \left\{ \begin{array}{l} k_\varphi(\varphi_{l1})a(t+d_\varphi(\varphi_{l1}), \varphi_{l1}) + \\ k_\varphi(\varphi_{l2})a(t+d_\varphi(\varphi_{l2}), \varphi_{l2}) \end{array} \right\} / \left( \begin{array}{l} k_\varphi(\varphi_{l1}) + \\ k_\varphi(\varphi_{l2}) \end{array} \right) \quad (23)$$

$$d_\varphi(\varphi) = \{k_\varphi(\varphi_{l1})d_\varphi(\varphi_{l1}) + k_\varphi(\varphi_{l2})d_\varphi(\varphi_{l2})\} / (k_\varphi(\varphi_{l1}) + k_\varphi(\varphi_{l2})) \quad (24)$$

The second correlation matrix calculation unit 208 performs the discrete Fourier transform on the transfer function vector $a(t+d_\phi(\phi_1), \phi_1)$ to calculate the transfer function vector $D(\phi_1)$ in the frequency domain.

The second correlation matrix calculation unit 208 calculates the square matrix $A(\phi_1)$ by multiplying the calculated transfer function vector $D(\phi_1)$ by the complex conjugate transpose vector $D^*(\phi_1)$ thereof.

According to this method, the square matrix $A(\phi_1)$ of the sound direction $\phi_1$ is smoothly interpolated in amplitude in the time domain between the square matrix $A(\phi_{l1})$ and the square matrix $A(\phi_{l2})$.

Alternatively, the second correlation matrix calculation unit 208 may calculate the square matrix $A(\phi_1)$ corresponding to the sound direction $\phi_1$ using an integration methodology combing the FDLI method and the M-EVSI method instead of the above-mentioned interpolation methods.

The correlation matrix information storage unit 209 stores the square matrix $A_1(\phi_1)$ of each sound direction $\phi_l$ and the diagonal matrix $\Delta_M(\phi_1, \phi_2)$ and the diagonal matrix $\Delta_M(\phi_1, \phi_2)$ for each set of the sound direction $\phi_1$ and the sound direction $\phi_2$ adjacent thereto as the correlation matrix information in advance.

An example employing the integration methodology will be described as another example of the square matrix interpolation process.

Figure 11:
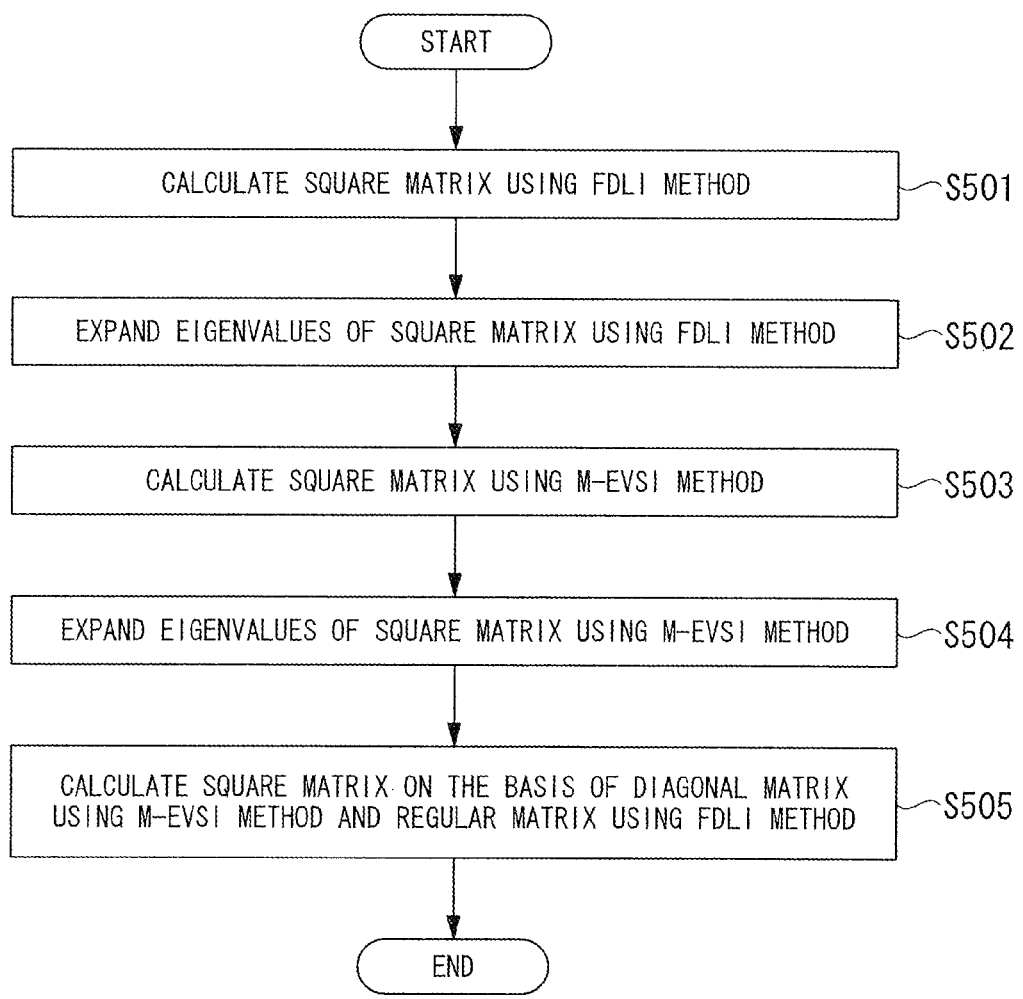
FIG. 11 is a flowchart illustrating another example of the square matrix interpolating process according to the second embodiment of the invention.

FIG. 11 is a flowchart illustrating another example of the square matrix interpolating process according to this embodiment.

(Step S501) The second correlation matrix calculation unit 208 calculates the square matrix $A_F(\phi_1)$ corresponding to the sound direction $\phi_1$ using the above-mentioned FDLI method. Thereafter, the process of step S502 is performed.

(Step S502) The second correlation matrix calculation unit 208 expands the eigenvalues of the square matrix $A_F(\phi_1)$ calculated using the FDLI method to calculate the regular matrix $E_F(\phi_1)$ and the diagonal matrix $\Delta_F(\phi_1)$ satisfying Equation 25. Thereafter, the process of step S503 is performed.

$$A_F(\phi_l) = E_F(\phi_l) \Delta_F(\phi_l) E_F^{-1}(\phi_l) \quad (25)$$

(Step S503) The second correlation matrix calculation unit 208 calculates the square matrix $A_M(\phi_l)$ corresponding to the sound direction $\phi_1$ using the above-mentioned M-EVSI method. Thereafter, the process of step S504 is performed.

(Step S504) The second correlation matrix calculation unit 208 expands the eigenvalues of the square matrix $A_F(\phi_1)$ calculated using the M-EVSI method to calculate the regular matrix $E_M(\phi_1)$ and the diagonal matrix $\phi_M(\phi_1)$ satisfying Equation 26. Thereafter, the process of step S505 is performed.

$$A_M(\phi_l) = E_M(\phi_l) \Delta_M(\phi_l) E_M^{-1}(\phi_l) \quad (26)$$

(Step S505) The second correlation matrix calculation unit 208 calculates the square matrix $A(\phi_1)$ by multiplying the left side of the diagonal matrix $\Delta_\phi(\phi_1)$ based on the M-EVSI method by the regular matrix $E_F(\phi_1)$ based on the FDLI method and multiplying the right side thereof by the inverse matrix $E_F^{-1}(\phi_1)$ of the regular matrix $E_F(\phi_1)$, as expressed by Equation 27. Thereafter, the process flow is ended.

$$A(\phi_l) = E_F(\phi_l) \Delta_M(\phi_l) E_F^{-1}(\phi_l) \quad (27)$$

Accordingly, the second correlation matrix calculation unit 208 can smoothly interpolate the amplitude characteristic using the regular matrix $E_F(\phi_1)$ based on the FDLI method and can smoothly interpolate the phase characteristic using the diagonal matrix $\Delta(\phi_1)$ based on the M-EVSI method, thereby calculating the square matrix $A(\phi_1)$ of any sound direction $\phi_1$.

The second correlation matrix calculation unit 208 calculates the interpolated sound source correlation matrix $V_l$ by multiplying the calculated square matrix $A(\phi_1)$ by the power $S_l S_l^*$ of the spectrum $S_l$ of the sound source 1. The second correlation matrix calculation unit 208 outputs the interpolated correlation matrix $V_l$ to the target sound selecting unit 110.

The transfer function storage unit 212 stores the transfer function vector $D(\phi)$ in correspondence with the sound direction $\phi$, similarly to the transfer function storage unit 103. However, the interval of the sound directions $\phi$ is smaller (for example, 1°) than that of the transfer function storage unit 103 and the number of sound directions, that is, the number of stored transfer function vectors $D(\phi)$, is larger (for example, 360 (=360°/1°)) than that of the transfer function storage unit 103.

The sound source localization unit 211 has the same configuration as the first sound source localization unit 111 and performs the same processes, but is different therefrom, in that the transfer function vector $D(\phi)$ not from the transfer function storage unit 103 but from the transfer function storage unit 212. Since the transfer function storage unit 212 stores the transfer function vectors $D(\phi)$ of the sound directions $\phi$ with a smaller interval, it is possible to calculate the sound directions $\phi$ with higher precision.

In this manner, according to an aspect of this embodiment, the correlation matrix information is stored for each discrete sound direction and the correlation matrix corresponding to the estimated sound direction is calculated using the correlation matrix information corresponding to the discrete sound direction adjacent to the estimated sound direction of the separated sound signal. Accordingly, since the correlation matrix corresponding to the estimated sound direction can be interpolated, it is possible to calculate the correlation matrix corresponding to any sound direction.

According to another aspect of this embodiment, the regular matrix is calculated by expanding the eigenvalues of the regular matrix which is obtained by interpolating the square matrix indicated by the correlation matrix information corresponding to the discrete sound direction in the frequency domain, the diagonal matrix is calculated by expanding the eigenvalues of the square matrix which is obtained by raising the ratio matrix indicated by the correlation matrix information corresponding to the discrete sound direction, and the correlation matrix corresponding to the sound direction estimated by the second sound source localization unit is calculated using the regular matrix and the diagonal matrix. Accordingly, it is possible to smoothly interpolate the correlation matrix in both amplitude and phase.

Third Embodiment

Hereinafter, a third embodiment of the invention will be described with reference to the accompanying drawings.

Figure 12:
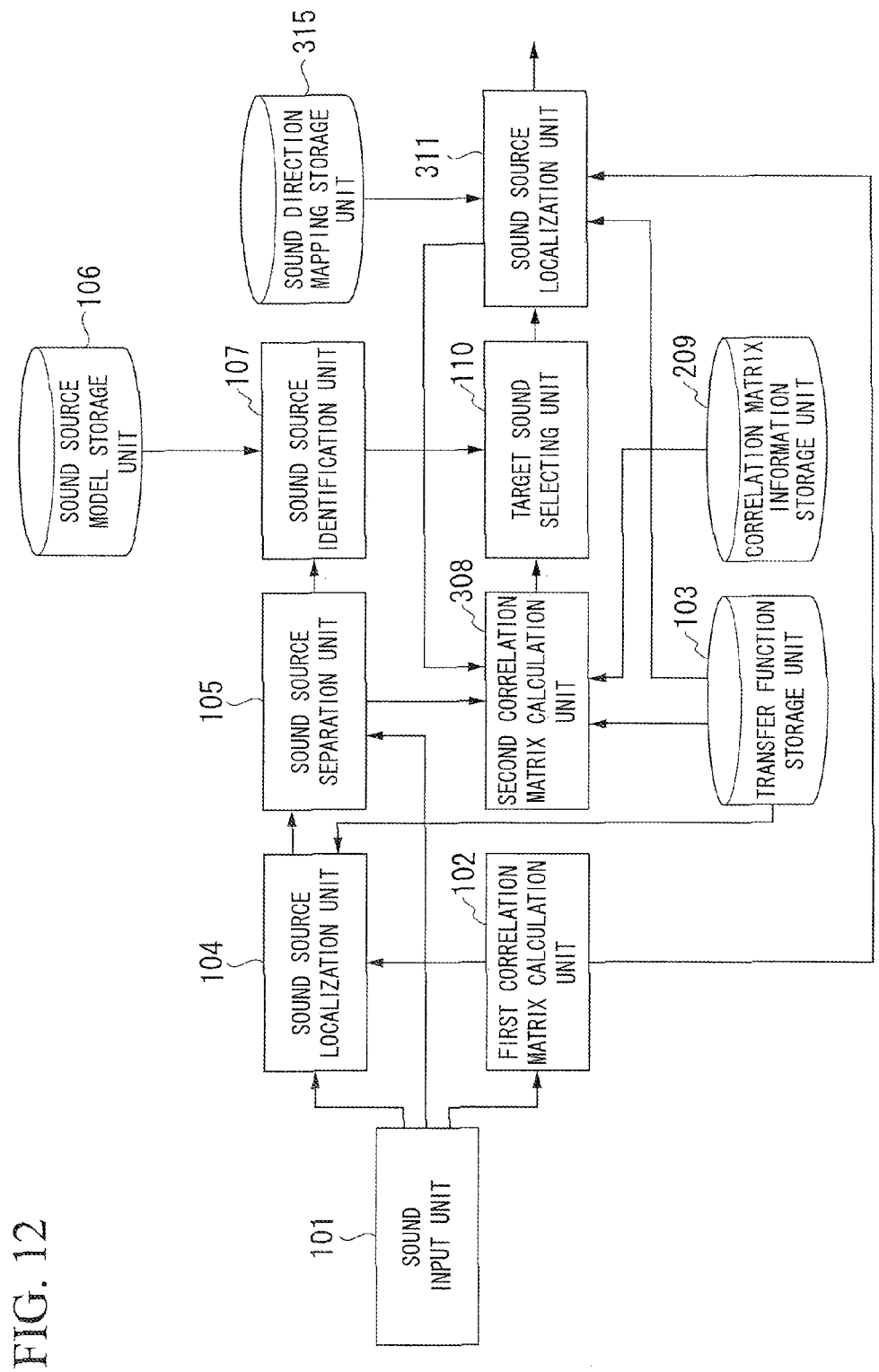
FIG. 12 is a diagram schematically illustrating the configuration of a sound direction estimation apparatus according to a third embodiment of the invention.

FIG. 12 is a diagram schematically illustrating the configuration of a sound direction estimation apparatus 3 according to the third embodiment of the invention.

The sound direction estimation apparatus 3 includes a sound input unit 101, a first correlation matrix calculation unit 102, a transfer function storage unit 103, a sound source localization unit 104, a sound source separation unit 105, a sound source model storage unit 106, a sound source identification unit 107, a second correlation matrix calculation unit 308, a correlation matrix information storage unit 209, a target sound selecting unit 310, a sound source localization unit 211, and a transfer function storage unit 212.

That is, the sound direction estimation apparatus 3 is different from the sound direction estimation apparatus 1 shown in FIG. 1, in that the second correlation matrix calculation unit 308 and the sound source localization unit 311 are disposed instead of the second correlation matrix calculation unit 108 and the sound source localization unit 111 and the correlation matrix information storage unit 209 of the sound direction estimation apparatus 2 shown in FIG. 8 is further provided. Hereinafter, the differences from the sound direction estimation apparatuses 1 and 2 will be mainly described and the common points to the sound direction estimation apparatuses 1 and 2 will not be repeated.

In this embodiment, the second correlation matrix calculation unit 308 interpolate the sound source correlation matrix $V_l$ of the sound source 1 corresponding to the class information $\lambda$ based on the direction factor information $D_A$ between the discrete sound direction $\phi_{1l}$ indicated by the discrete sound direction information input from the sound source localization unit 311 and the discrete sound direction $\phi_{2l}$ adjacent thereto. The sound source localization unit 311 determines the direction factor $D_A$ based on the correlation matrix $K_\lambda$ of the class information $\lambda$ calculated using the interpolated sound source correlation matrix $V_I$ and determines the sound direction of the sound source 1 corresponding to the class information $\lambda$ based on the determined direction factor $D_A$. Accordingly, in this embodiment, it is possible to determine the sound direction information indicating continuous sound directions. The sound source localization unit 311 does not have to have the configuration for calculating the spatial spectrum $P(\phi)$, unlike the second sound source localization units 111 and 211. Hereinafter, the configurations and processes of the units will be described.

The discrete sound direction information $\phi_{11}$ and the direction factor information $D_A$ from the sound source localization unit 311 are input to the second correlation matrix calculation unit 308.

The second correlation matrix calculation unit 308 reads the correlation matrix information corresponding to the input discrete sound direction information $\phi_{11}$ and the discrete sound direction information $\phi_{21}$ indicating the sound direction adjacent thereto from the correlation matrix information storage unit 209. Alternatively, the second correlation matrix calculation unit 308 reads the transfer functions corresponding to the input discrete sound direction information $\phi_{11}$ and the discrete sound direction information $\phi_{21}$ indicating the sound direction adjacent thereto from the transfer function storage unit 103.

The second correlation matrix calculation unit 308 calculates the square matrix $A(D_A)$ based on the input direction fact information $D_A$ using the correlation matrix information or the transfer functions. Here, the second correlation matrix calculation unit 308 calculate the square matrix $A(D_A)$ based on the direction factor information $D_A$ using one interpolation method of the M-EVSI method, the S-EVSI method, the FDLI method, and the TDLI method described in the second embodiment. The second correlation matrix calculation unit 308 calculate the square matrix $A(D_A)$ based on the direction factor information $D_A$ instead of the direction information $\phi_I$. Which of the correlation matrix information and the transfer functions the second correlation matrix calculation unit 308 uses to calculate the square matrix $A(D_A)$ depends on the interpolation method, as described in the second embodiment.

When the second correlation matrix calculation unit 308 calculates the square matrix $A(D_A)$ using the integration methodology, the interpolation method shown in FIG. 11 is used for the square matrix $A(D_A)$ calculated using the M-EVSI method and the square matrix $A(D_A)$ calculated using the FLDI method, as described above.

The second correlation matrix calculation unit 308 calculates the interpolated sound source correlation matrix $V_I$ by multiplying the calculated square matrix $A(D_A)$ by the power $S_I S_I^*$ of the spectrum $S_I$ of the sound source 1. The second correlation matrix calculation unit 308 outputs the interpolated sound source correlation matrix $V_I$ to the target sound selecting unit 110.

The sound source localization unit 311 calculates the sound direction information corresponding to the class information $\lambda$ based on the correlation matrix $K_\lambda$ of each class information $\lambda$ calculated based on the sound source correlation matrix $V_I$ from the target sound selecting unit 110. Here, the sound source localization unit 311 calculates the sound direction information, for example, by performing an off-line process based on the GEVD-MUSIC method.

First, the sound source localization unit 311 calculates the spatial spectrum $P(\phi_{11})$ of each frequency every discrete sound direction information indicating the discrete sound direction $\phi_{11}$ stored in the transfer function storage unit 103. The sound source localization unit 311 selects the maximum value (peak value) of each frequency in the calculated spatial spectrum $P(\phi_{11})$. The sound source localization unit 311 selects the discrete sound direction information $\phi_{11}$ in which the peak value of the spatial spectrum $P(\phi_{11})$ is the lowest. The sound source localization unit 311 primarily estimates the sound direction information in this manner. The lowest peak value means that the spatial spectrum is flat, that is, that the correlation matrix $K_\lambda$ is close to a unit matrix I and the influence of the correlation matrix $K_\lambda$ in the eigenvalue expansion is reduced.

The spatial spectrum $P(D_A)$ of each frequency corresponding to the discrete sound direction information $\phi_{11}$ is calculated for each direction factor $D_A$. The sound source localization unit 311 selects the peak value of each frequency in the calculated spatial spectrum $P(D_A)$. The sound source localization unit 311 selects the direction factor $D_A$ minimizing the peak value of the spatial spectrum $P(D_A)$. The sound source localization unit 311 performs the following process based on the selected sound direction information to finally determine the sound direction.

The process of calculating the spatial spectrum $P(D_A)$ for each of the above-mentioned directions and selecting the direction coefficient $D_A$ will be described below in more detail. The process of calculating the spatial spectrum $P(D_A)$ for each discrete sound direction information $\phi_{11}$ and selecting the direction factor $D_A$ is also the same as this process. However, in step S606, the transfer function $D(\phi_{11})$ is read for each discrete direction information $\phi_{11}$ and the spatial spectrum $P(\phi_{11})$ is calculated using the read transfer function $D(\phi_{11})$.

Figure 13:
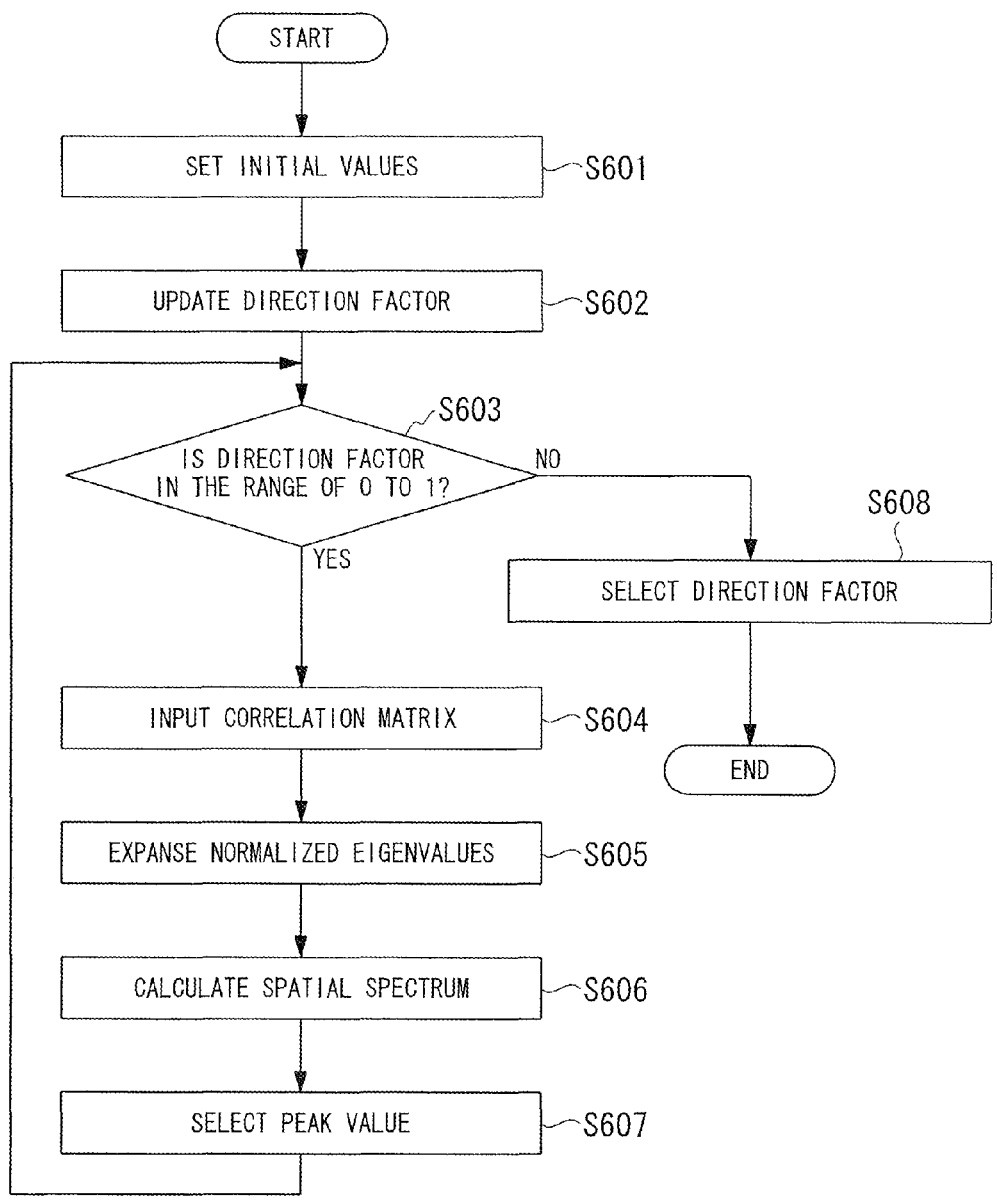
FIG. 13 is a flowchart illustrating an example of a sound direction information calculating process according to the third embodiment of the invention.

FIG. 13 is a flowchart illustrating an example of the sound direction information estimating process according to this embodiment.

(Step S601) The sound source localization unit 311 sets the initial value of the direction factor $D_A$ to 0. Thereafter, the process of step S602 is performed.

(Step S602) The sound source localization unit 311 adds a preset increment (for example, 0.01) to the direction factor $D_A$ to update the direction factor $D_A$. Thereafter, the process of step S603 is performed.

(Step S603) The sound source localization unit 311 determines whether the direction factor $D_A$ is in the range of 0 to 1. When the sound source localization unit 311 determines that the direction factor $D_A$ is in the range of 0 to 1 (YES in step S603), the process of step S604 is performed. When the sound source localization unit 311 determines that the direction factor $D_A$ is smaller than 0 or greater than 1 (NO in step S603), the process of step S609 is performed.

(Step S604) The correlation matrix $K_\lambda$ of each class information $\lambda$ is input to the sound source localization unit 311 from the target sound selecting unit 110. Thereafter, the process of step S605 is performed.

(Step S605) The sound source localization unit 311 performs the normalized eigenvalue expansion on the unit matrix I and the input correlation matrix $K_\lambda$ instead of the input correlation matrix $R_{xx}$ to calculate the eigenvalues $\delta_m$ and the eigenvectors $e_m$ satisfying the relationship expressed by Equation 16. Thereafter, the process of step S606 is performed.

(Step S606) The sound source localization unit 311 substitutes the calculated eigenvectors $e_m$ instead of the transfer function $D(D_A)$ and the eigenvalues e, corresponding to the discrete sound direction information $\phi_{1l}$ for Equation 3 to calculate the spatial spectrum $P(D_A)$. Thereafter, the process of step S607 is performed (Step S607) The sound source localization unit 311 selects the frequency peak value of the spatial spectrum $P(D_A)$. Thereafter, the process of step S602 is performed.

(Step S608) The sound source localization unit 311 selects the direction factor $D_A$ minimizing the frequency peak value of the spatial spectrum $P(D_A)$. Accordingly, the direction factor $D_A$ at which the frequency dependency of the spatial spectrum $P(D_A)$ is flattest, that is, at which the correlation matrix $K_\lambda$ is closest to the input correlation matrix $R_{xx}$ set to a unit matrix I, is selected. That is, the direction factor $D_A$ based on the correlation matrix $K_\lambda$ corresponds to the direction factor $D_A$ based on the input correlation matrix $R_{xx}$ indicating the actual arrival direction of a sound source. Thereafter, the process flow is ended.

The sound source localization unit 311 calculates the sound direction information $\phi_l$ corresponding to the selected discrete sound direction information $\phi_{1l}$ and the selected direction factor $D_A$, for example, using Equation 28.

$$\phi_l(D_A, \phi_{1l}) = a/(1+\exp(-b(D_A-c))) + d \quad (28)$$

In Equation 28, $\phi_l(D_A, \phi_{1l})$ is a sigmoidal function approaching a+d as $D_A$ becomes closer to $+\infty$ and approaching d as $D_A$ comes closer to $-\infty$. Mapping coefficients a, b, c, and d are real values different depending on the discrete sound direction information $\phi_{1l}$. The sound source localization unit 311 performs the following process and stores the mapping coefficients in the sound direction mapping storage unit 315. The sound source localization unit 311 reads the mapping coefficients at the time of calculating the sound direction information $\phi_l$. The mapping coefficients a, b, c, and d satisfy the relationship that $\phi_l(0, \phi_{1l})=\phi_{1l}$ when $D_A=0$ and $\phi_l(1, \phi_{1l})=\phi_{2l}$ when $D_A=1$.

The sound source localization unit 311 outputs the determined sound direction information $\phi_l$ to the outside of the sound direction estimation apparatus 3.

Although it has been described that the sound source localization unit 311 applies the sigmoidal function expressed by Equation 28 to the sound direction information $\phi_l$, this embodiment is not limited to this configuration. The sound source localization unit 311 may employ a polynomial of the direction factor $D_A$ instead of the sigmoidal function. In this case, the mapping coefficients are coefficients of the terms.

Alternatively, the sound source localization unit 311 may not sequentially calculate the sound direction information $\phi_l$ but may read the sound direction information $\phi_l$ corresponding to the selected discrete sound direction information $\phi_{1l}$ and the selected direction factor information $D_A$ from the storage unit.

A method of calculating the mapping coefficient a, b, c, and d defining the relationship between the discrete direction information $\phi_{1l}$ and the direction factor $D_A$ and the sound direction information $\phi_l$ will be described below. In the following process is performed every discrete sound direction information $\phi_{1l}$.

Figure 14:
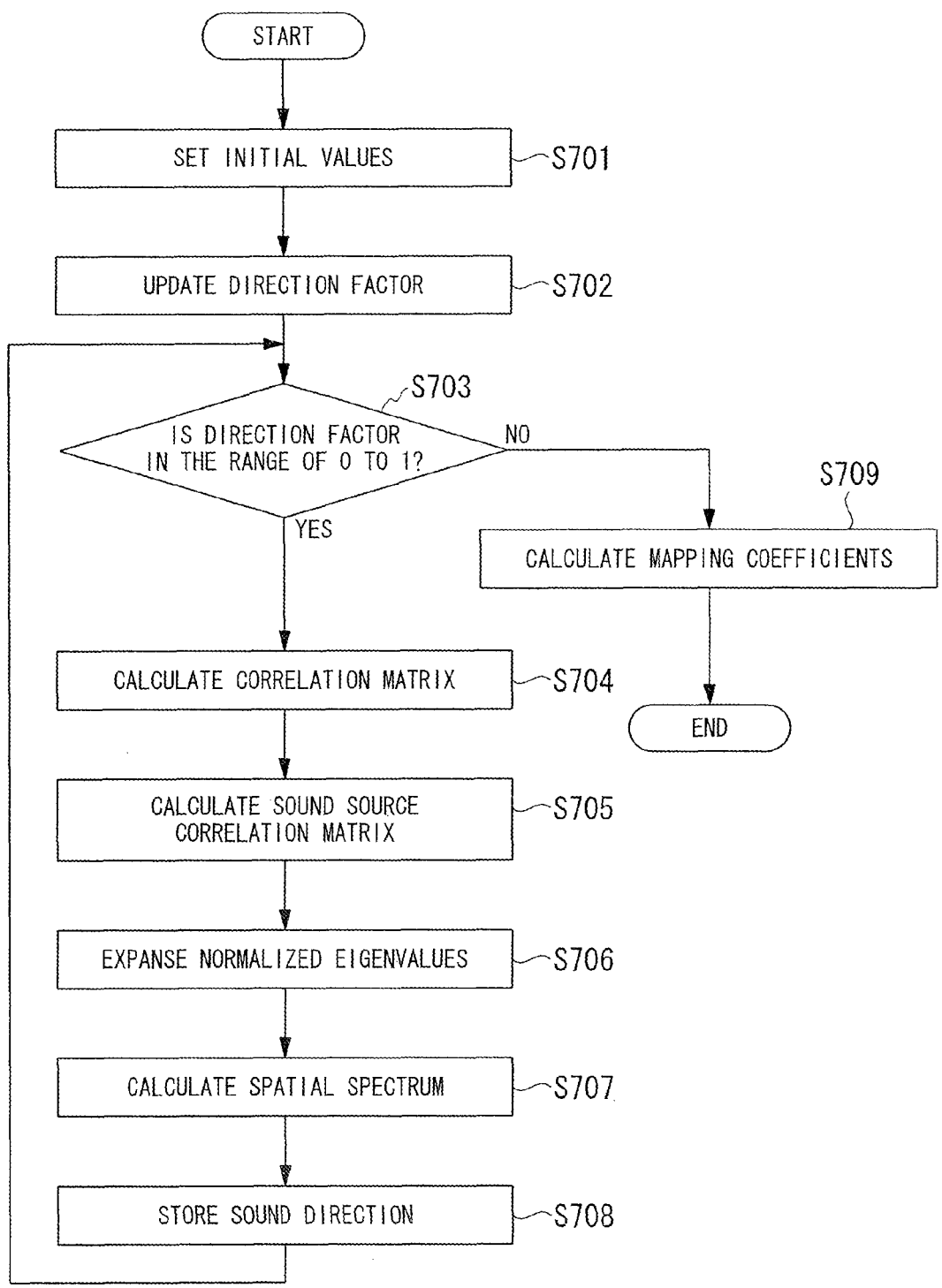
FIG. 14 is a flowchart illustrating a mapping coefficient calculating process according to the third embodiment of the invention.

FIG. 14 is a flowchart illustrating the mapping coefficient calculating process according to this embodiment.

(Step S701) The sound source localization unit 311 sets the initial value of the direction factor $D_A$ to 0. Thereafter, the process of step S702 is performed.

(Step S702) The sound source localization unit 311 adds a preset increment (for example, 0.01) to the direction factor $D_A$ to update the direction factor $D_A$. Thereafter, the process of step S703 is performed.

(Step S703) The sound source localization unit 311 determines whether the direction factor $D_A$ is in the range of 0 to 1. When the sound source localization unit 311 determines that the direction factor $D_A$ is in the range of 0 to 1 (YES in step S703), the process of step S704 is performed. When the sound source localization unit 311 determines that the direction factor $D_A$ is smaller than 0 or greater than 1 (NO in step S703), the process of step S709 is performed.

(Step S704) The sound source localization unit 311 calculates (interpolates) the square matrix $A(\phi_l)$ for each sound direction $\phi_l$ using the correlation matrix information read from the correlation matrix information storage unit 209 or the transfer functions read from the transfer function storage unit 103, similarly to the second correlation matrix calculation unit 208. Thereafter, the process of step S705 is performed.

(Step S705) The sound source localization unit 311 calculates the sound source correlation matrix $V_l$ by multiplying the calculated square matrix $A(\phi_l)$ by the power $S_l S_l^*$ of the spectrum $S_l$ based on the sound signal of a sound source 1. Thereafter, the process of step S706 is performed.

(Step S706) The sound source localization unit 311 performs the normalized eigenvalue expansion on the unit matrix I instead of the correlation matrix $K_\lambda$ corresponding to the class information $\lambda$ and the calculated sound source correlation matrix $V_l$ instead of the input correlation matrix $R_{xx}$ and calculates the eigenvalues and the eigenvectors $e_m$ satisfying the relationship expressed by Equation 16. Thereafter, the process of step S707 is performed.

(Step S707) The sound source localization unit 311 substitutes the transfer function $D(D_A)$ corresponding to the discrete sound direction information $\phi_{1l}$ and the eigenvector $e_m$ instead of the eigenvectors e, for Equation 3 to calculate the spatial spectrum $P(\phi_l)$ of each frequency. Thereafter, the process of step S708 is performed.

(Step S708) The sound source localization unit 311 selects the sound direction $\phi_l$ corresponding to the frequency peak value of the spatial spectrum $P(\phi_l)$ and stores the selected sound direction in its own storage unit in correspondence with the direction factor information $D_A$. Thereafter, the process of step S702 is performed.

(Step S709) The sound source localization unit 311 fits the sound direction information $\phi_l$ calculated based on the direction factor information $D_A$ to the sound direction $\phi_l$ stored in the storage unit so as to minimize the error and calculates the mapping coefficients a, b, c, and d. The sound source localization unit 311 calculates the mapping coefficients a, b, c, and d, for example, using Equation 28. The sound source localization unit 311 uses, for example, the least square method in the fitting process. The sound source localization unit 311 stores the calculated mapping coefficients in the sound direction mapping storage unit 315. Thereafter, the process flow is ended.

In this manner, in this embodiment, the correlation matrix of the input sound signal is set to a unit matrix, the spatial spectrum is calculated on the eigenvectors calculated by performing the eigenvalue expansion on the correlation matrix calculated by the correlation matrix calculation unit, and the sound direction information minimizing the peak of the calculate spatial spectrum is estimated.

Accordingly, it is possible to estimate the sound direction information of any direction without sequentially interpolating the transfer functions or the square matrix at the time of calculating the direction factor information.

Fourth Embodiment

Hereinafter, a fourth embodiment of the invention will be described with reference to the accompanying drawings.

Figure 15:
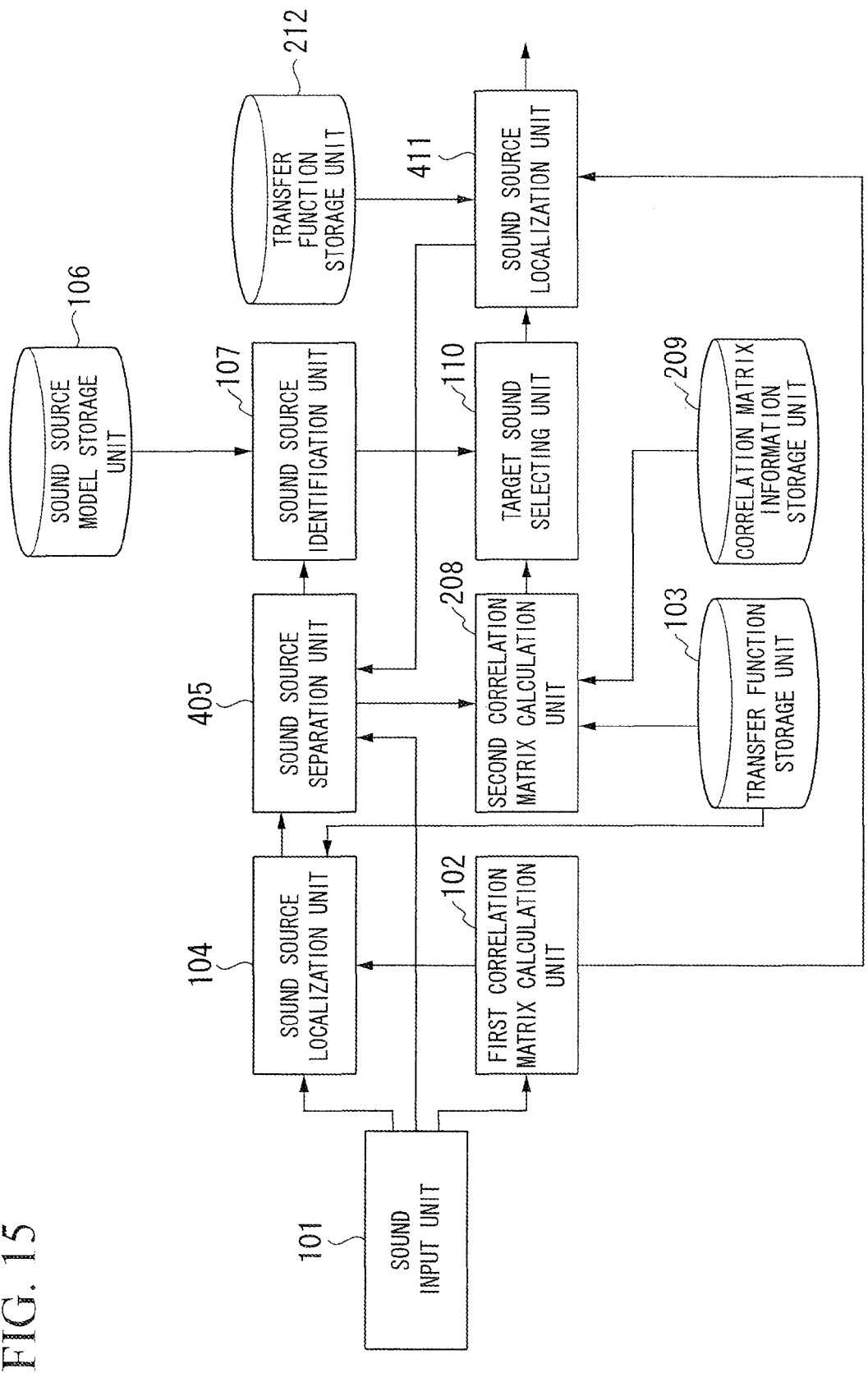
FIG. 15 is a diagram schematically illustrating the configuration of a sound direction estimation apparatus according to a fourth embodiment of the invention.

FIG. 15 is a diagram schematically illustrating the configuration of a sound direction estimation apparatus 4 according to the fourth embodiment of the invention.

The sound direction estimation apparatus 4 includes a sound input unit 101, a first correlation matrix calculation unit 102, a transfer function storage unit 103, a sound source localization unit 104, a sound source separation unit 405, a sound source model storage unit 106, a sound source identification unit 107, a second correlation matrix calculation unit 208, a correlation matrix information storage unit 209, a target sound selecting unit 110, a sound source localization unit 411, and a transfer function storage unit 212.

That is, the sound direction estimation apparatus 4 is different from the sound direction estimation apparatus 2 shown in FIG. 8, in that the sound source separation unit 405 and the sound source localization unit 411 are disposed instead of the sound source separation unit 105 and the sound source localization unit 211. Hereinafter, the differences from the sound direction estimation apparatus 2 will be mainly described and the common points to the sound direction estimation apparatus 2 will not be repeated.

The sound source localization unit 411 having the same function as the sound source localization unit 211 and performs the same processes. However, the sound source localization unit 411 outputs the sound direction information of each sound source 1 corresponding to the determined target sound (class information λ) to the sound source separation unit 405 in addition to the outside of the sound direction estimation apparatus 4.

The sound source separating process performed by the sound source separation unit 405 will be described below.

Figure 16:
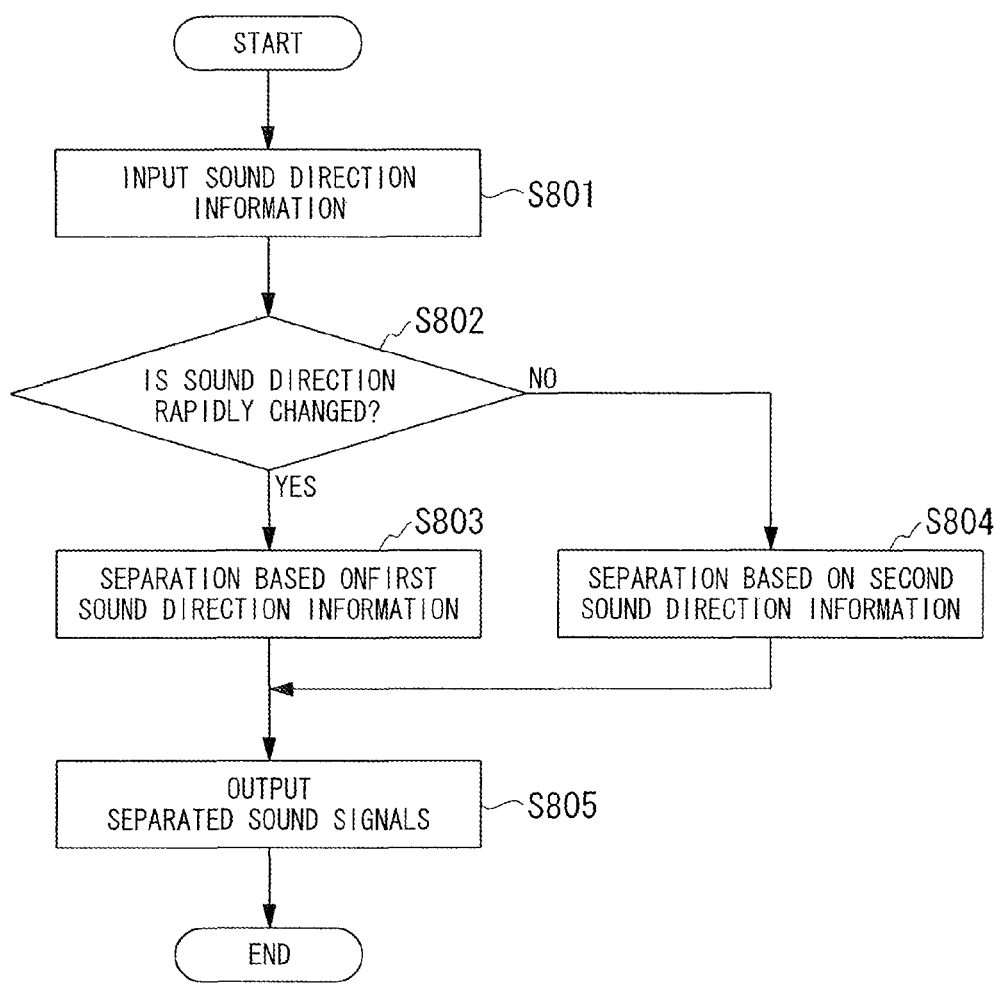
FIG. 16 is a flowchart illustrating a sound source separating process according to the fourth embodiment of the invention.

FIG. 16 is a flowchart illustrating the sound source separating process according to this embodiment.

(Step S801) The sound source separation unit 405 receives the sound direction information of each sound source 1 from the first sound source localization 104 and receives the sound direction information of each sound source 1 corresponding to the class information λ from the sound source localization unit 411. Thereafter, the process of step S802 is performed.

(Step S802) the sound source separation unit 405 determines whether the sound direction is rapidly changed based on the input sound direction. Here, for example, the sound source separation unit 405 determines whether the absolute value of the difference between the sound direction at the current frame time indicated by the sound direction information input from the sound source localization unit 104 and the sound source localization unit 411 and the sound direction at a previous (for example, right previous) frame time is greater than a predetermined angle.

When the sound source separation unit 405 determines whether the sound direction is rapidly changed (YES in step S802), the process of step S803 is performed. When the sound source separation unit 405 determines that the sound direction is not rapidly changed based on the input sound direction (NO in step S802), the process of step S804 is performed.

(Step S803) Similarly to the sound source separation unit 105, the sound source separation unit 405 separates the sound signal $s_l$ of each sound source 1 from the multi-channel sound signal input from the sound input unit 101 based on the sound direction information (first sound direction information) input from the sound source localization unit 104. Thereafter, the process of step S805 is performed.

(Step S804) The sound source separation unit 405 separates the sound signal $s_l$ of each sound source 1 from the multi-channel sound signal input from the sound input unit 101 based on the sound direction information (second sound direction information) input from the sound source localization unit 411. Thereafter, the process of step S805 is performed.

(Step S805) Here, the sound source separation unit 405 outputs the sound signal $s_l$ of each sound source 1 to the sound source identification unit 107 and the second correlation calculation unit 108. Thereafter, the process flow is ended.

Therefore, the sound source separation unit 405 can separate a sound source arriving from the sound direction estimated with high precision by the sound source localization unit 411 when the sound direction is not rapidly changed. Accordingly, it is possible to calculate the class information (sound source class) or the sound direction of the separated sound source with higher precision.

When the sound direction is rapidly changed, the sound source is separated using the sound direction primarily estimated by the sound source localization unit 104. Accordingly, even when the sound direction is rapidly changed, it is possible to provide a clue to calculating the sound direction with high precision using the separation sound source.

In the other points, the sound source separation unit 405 has the same configurations as the sound source separation unit 105 and performs the same processes.

In this embodiment, the target sound selecting unit 110 may output a interest index $D_1$ as an example of information indicating a degree of interest in each sound source 1 to the sound source separation unit 405 and the sound source separation unit 405 may receive the interest index $D_1$ from the target sound selecting unit 110. The sound source separation unit 405 determines whether the sound signal $s_l$ of each sound source 1 generated based on the interest index $D_1$ should be output to the sound source identification unit 107 or the second correlation matrix calculation unit 208. The sound source separation unit 405 does not output the sound signal $s_l$ of the sound source 1 of which the interest index $D_1$ is greater than a predetermined threshold value (that is, the degree of interest is lower) to the sound source identification unit 107 or the second correlation matrix calculation unit 208. Accordingly, in this embodiment, it is possible to simplify the processes without performing the processes of calculating the correlation matrix $V_l$, determining the class information $\lambda_1$, and calculating the sound direction for the sound source 1 of a class in which a user's interest is low.

This embodiment is not limited to the configuration shown in FIG. 15. For example, the sound direction estimation apparatus 3 shown in FIG. 12 may include the sound source separation unit 405 instead of the sound source separation unit 105 and may cause the sound source separation unit 405 to receive the sound direction information of each sound source 1 from the sound source localization unit 211.

The verification result of the sound direction estimation apparatus 4 according to this embodiment will be described below.

In this verification, similarly to the first verification, the sound input unit 101 is disposed in the head part of a humanoid robot, a female voice is reproduced on the front-left side (60°) of the robot, jazz music is reproduced on the front side (0°) thereof, and a male voice is reproduced on the front-right side)(−60° thereof. The sound sources are made to be stationary.

The sound source separation unit 405 receives the interest index $D_1$ from the target sound selecting unit 110 and determines whether the separated sound signal of the corresponding sound source 1 should be output based on the received interest index $D_1$.

An example of an estimated sound direction according to this embodiment will be described.

Figure 17:
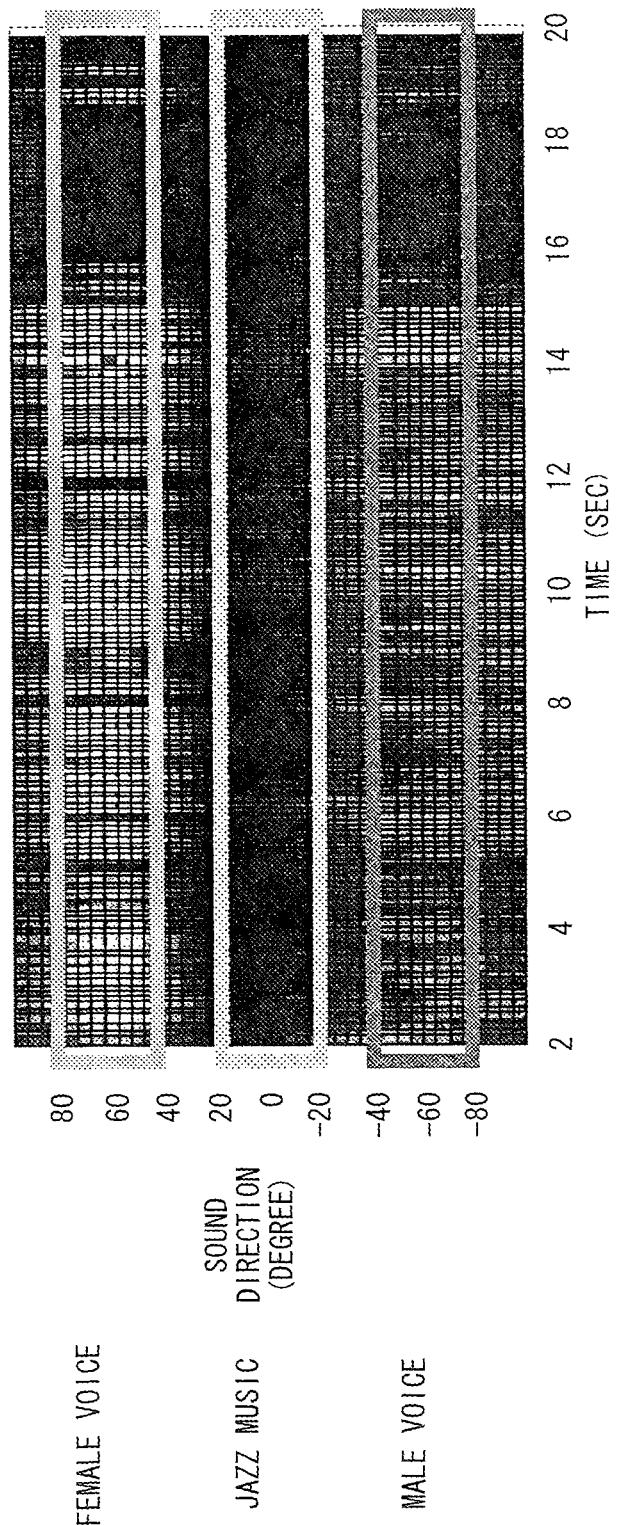
FIG. 17 is a diagram illustrating an example of estimated sound directions according to the fourth embodiment of the invention.

FIG. 17 is a diagram illustrating an example of an estimated sound direction according to this embodiment.

In FIG. 17, the vertical axis represents the sound direction (degree) and the horizontal axis represents the time (sec). The shading in FIG. 17 indicates the power of the sound signal of each sound source, a dark portion means smaller power, and a bright portion means greater power.

FIG. 17 shows that portions brighter than the surroundings are distributed in the sound directions of 60°, 0°, and −60°. As a result, it can be seen that the sound source separation unit 405 can separate the male voice, the female voice, and the jazz music well and the sound source localization unit 411 can estimate the sound directions with high precision.

Compared with the result shown in FIG. 16, it can be seen from the result shown in FIG. 17 that the precision in separation of the sound source and estimation of the sound direction for the jazz music reproduced at the sound direction of 0° is improved.

Therefore, according to this embodiment, it is possible to satisfactorily separate the sound signals of the sound sources based on the estimated sound direction information, thereby improving the precision in estimating the sound direction.

In this manner, according to an aspect of the invention, the sound signal input from the sound input unit can be separated into sound signal by sound sources based on the sound direction estimated by the second sound source localization unit. Accordingly, it is possible to satisfactorily separate the sound signals of the sound sources having different directions and to estimate the sound directions of the sound sources with high precision.

Fifth Embodiment

Hereinafter, a fifth embodiment of the invention will be described with reference to the accompanying drawings.

Figure 18:
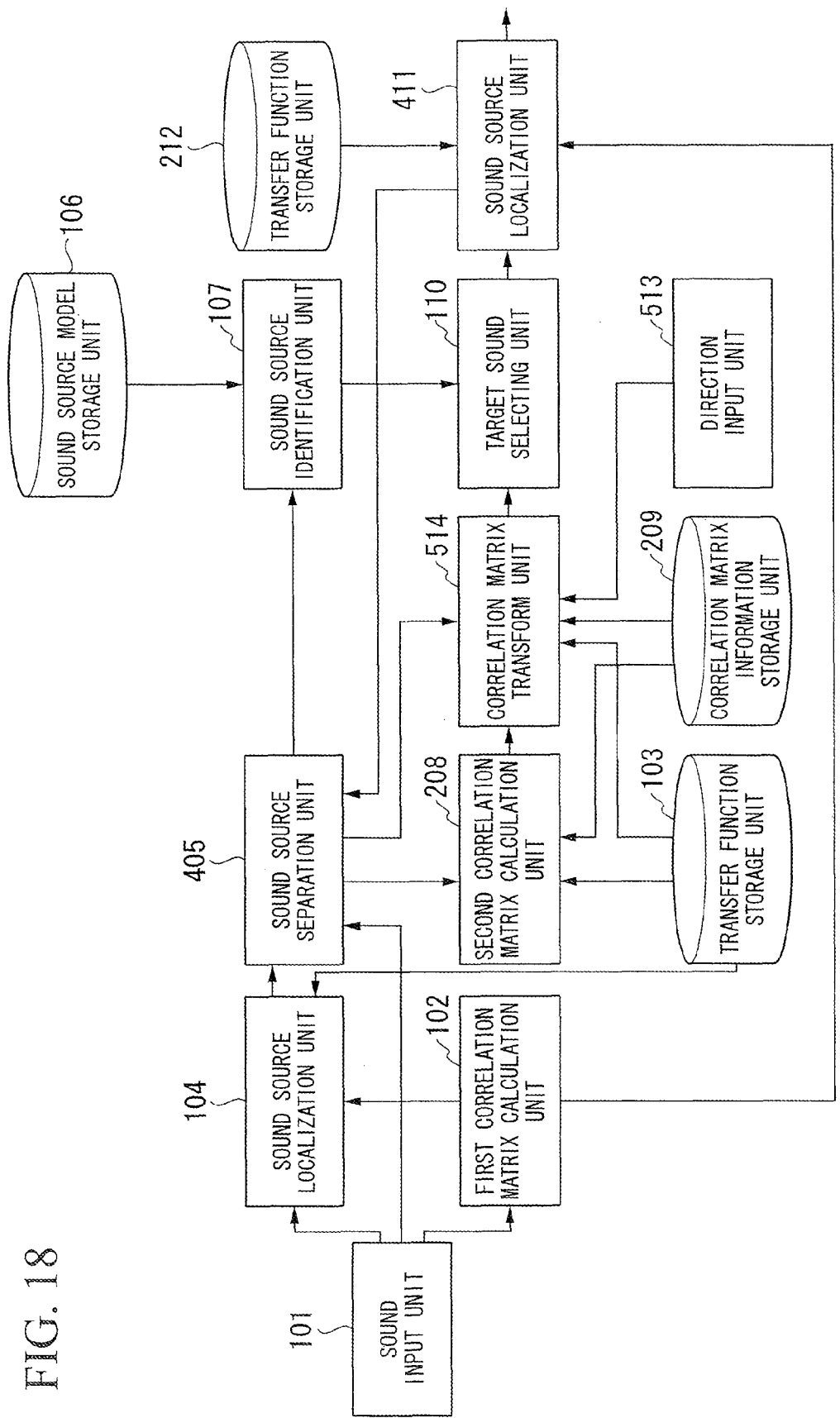
FIG. 18 is a diagram schematically illustrating the configuration of a sound direction estimation apparatus according to a fifth embodiment of the invention.

FIG. 18 is a diagram schematically illustrating the configuration of a sound direction estimation apparatus 5 according to the fifth embodiment of the invention.

The sound direction estimation apparatus 5 includes a sound input unit 101, a first correlation matrix calculation unit 102, a transfer function storage unit 103, a sound source localization unit 104, a sound source separation unit 505, a sound source model storage unit 106, a sound source identification unit 107, a second correlation matrix calculation unit 208, a correlation matrix information storage unit 209, a target sound selecting unit 110, a sound source localization unit 411, a transfer function storage unit 212, a direction input unit 513, and a correlation matrix transform unit 514.

That is, the sound direction estimation apparatus 5 is different from the sound direction estimation apparatus 4 shown in FIG. 15, in that it includes the direction input unit 513 and the correlation matrix transform unit 514 which are not provided to the sound direction estimation apparatus 4. Hereinafter, the differences from the sound direction estimation apparatus 4 will be mainly described and the common points to the sound direction estimation apparatus 4 will not be repeated.

In this configuration, the correlation matrix transform unit 514 corrects the sound source correlation matrix $V_l$ of each sound source 1 of the sound direction information $\phi_l$ based on the input direction information θ input from the direction input unit 513. The sound source localization unit 411 estimates the sound direction using the corrected sound source correlation matrix $V_l$.

The direction input unit 513 receives the input direction information θ every frame time. The direction input unit 513 may be, for example, any one of a control unit generating the input direction information θ indicating the direction of the robot controlling the robot's behavior, a position sensor sensing the input direction information θ, and an input interface receiving the input direction information θ from the control unit or the position sensor.

The direction input unit 513 outputs the received input direction information θ to the correlation matrix transform unit 514.

The correlation matrix transform unit 514 transforms the sound source correlation matrix $V_l$ of each sound source 1 (the sound direction information $\phi_l$) input from the second correlation matrix calculation unit 208 based on the input direction information θ input from the direction input unit 513 at a previous frame time.

Here, when the sound direction $\phi_l$ and the input direction information θ are expressed by a global coordinate system (also referred to as a world coordinate system) representing the absolute directions of the overall space, the sound direction relative to the direction information θ is $\phi_l - \theta$ (expressed by $\psi_l$).

The process of causing the correlation matrix transform unit 514 to transform the sound source correlation matrix $V_l$ will be described below.

Figure 19:
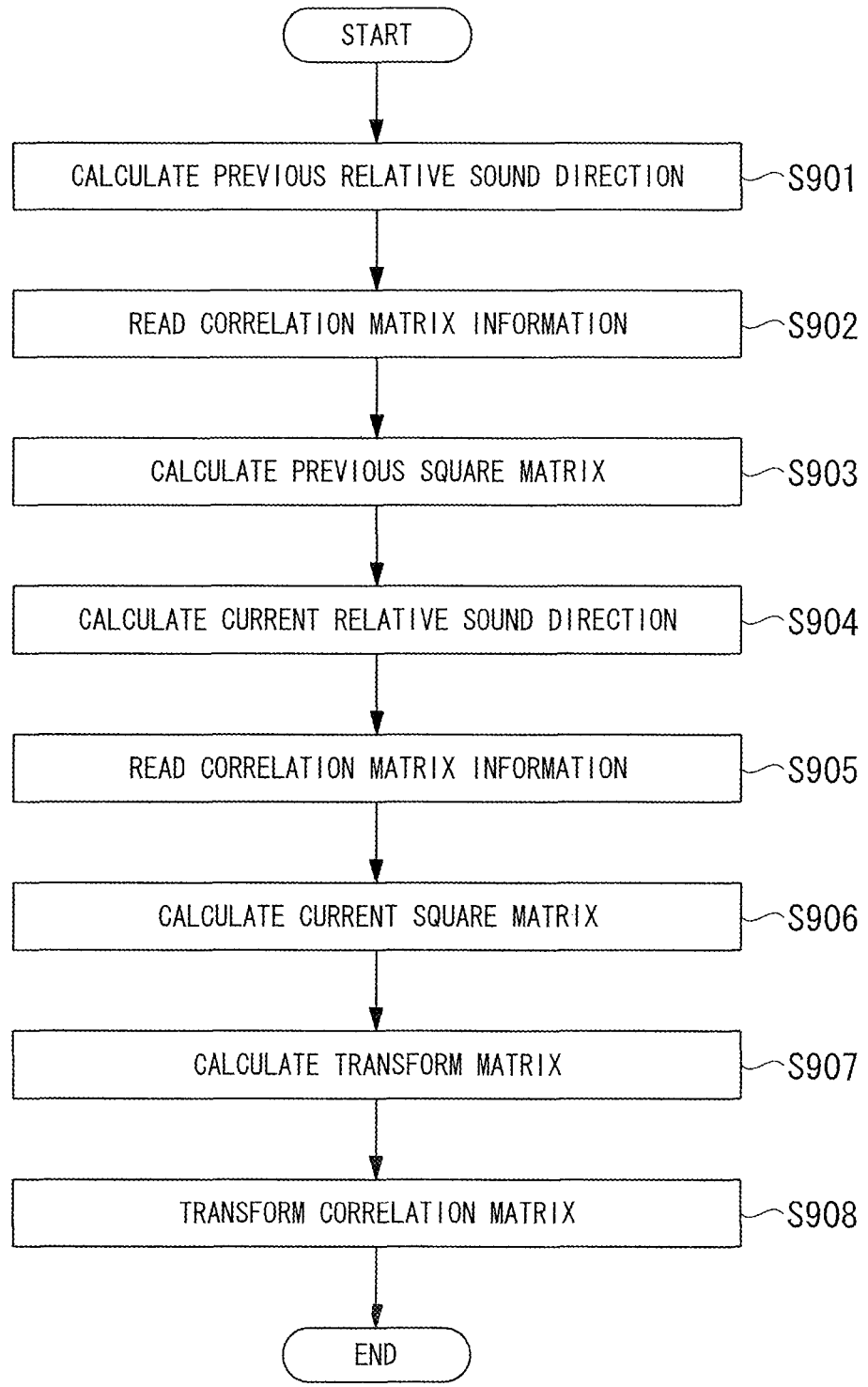
FIG. 19 is a flowchart illustrating a sound source correlation matrix transforming process according to the fifth embodiment of the invention.

FIG. 19 is a flowchart illustrating the sound source correlation matrix transforming process according to this embodiment.

(Step S901) The correlation matrix transform unit 514 calculates the sound direction $\psi_1$ relative to the direction information θ input from the direction input unit 513 at the previous frame time. Thereafter, the process of step S902 is performed.

(Step S902) The correlation matrix transform unit 514 reads the correlation matrix information corresponding to the direction information indicating the discrete directions $\psi_{1l}$ and $\psi_{2l}$ adjacent to both sides of the relative sound direction $\psi_1$ from the correlation matrix information storage unit 209. Thereafter, the process of step S903 is performed.

(Step S903) the correlation matrix transform unit 514 calculates the square matrix $A(\psi_1)$ corresponding to (interpolated by) the previous sound direction $\psi_1$ using the read correlation matrix information. Here, the correlation matrix transform unit 514 calculates the square matrix $A(\psi_1)$ using the same method as the second correlation matrix calculation unit 208. Thereafter, the process of step S904 is performed.

(Step S904) The correlation matrix transform unit 514 calculates the sound direction $\psi_1'$ relative to the direction information θ' input from the direction input unit 513 at the current frame time. Thereafter, the process of step S905 is performed.

(Step S905) The correlation matrix transform unit 514 reads the correlation matrix information corresponding to the direction information indicating the discrete directions $\psi_{1l}'$ and $\psi_{2l}'$ adjacent to both sides of the relative sound direction $\psi_1'$ from the correlation matrix information storage unit 209. Thereafter, the process of step S906 is performed.

(Step S906) the correlation matrix transform unit 514 calculates the square matrix $A(\psi_1')$ corresponding to (interpolated by) the current sound direction $\psi_1'$ using the read correlation matrix information. Here, the correlation matrix transform unit 514 calculates the square matrix $A(\psi_1')$ using the same method as the second correlation matrix calculation unit 208. Thereafter, the process of step S907 is performed.

(Step S907) The correlation matrix transform unit 514 calculate the transform matrix $T(\psi_l, \psi_l')$ used to transform the sound direction $\psi_l$ into $\psi_l'$ based on the previous square matrix $A(\psi_l)$ and the current square matrix $A(\psi_1')$. Here, the correlation matrix transform unit 514 uses, for example, Equation 29.

$$T(\psi_l,\psi_l')=A(\psi_l')/A(\psi_l) \quad (29)$$

In Equation 29, $A(\psi_l'|A(\psi_l))$ represents the operation of dividing the matrix elements of the previous square matrix $A(\psi_l')$ by the corresponding matrix elements of the square matrix $A(\psi_l)$.

The correlation matrix transform unit 514 may calculate the transform matrix $T(\psi_l,\psi_l')$ by multiplying the square matrix $A(\psi_l')$ by the inverse matrix $A(\psi_l)^{-1}$ of the square matrix $A(\psi_l)$ instead of using Equation 29. Thereafter, the process of step S908 is performed.

(Step S908) The correlation matrix transform unit 514 operationally applies the transform matrix $T(\psi_l, \psi_l')$ to the sound source correlation matrix $V_l$ to calculate the transformed sound source correlation matrix $V_l'$. Here, the correlation matrix transform unit 514 uses, for example, Equation 30.

$$V_l'=T(\psi_l,\psi_l')\hat{\times}V_l \quad (30)$$

In Equation 30, the mark including x in O means that the values of the matrix elements of the left transform matrix $T(\psi_l, \psi_l')$ are multiplied by the values of the corresponding matrix elements of the right matrix $V_l$.

The correlation matrix transform unit 514 may calculate the transformed sound source correlation matrix $V_l'$ by multiplying the sound source correlation matrix $V_l$ by the transform matrix $T(\psi_l, \psi_l')$, instead of using Equation 30.

Thereafter, the process flow is ended.

In the process shown in FIG. 19, the reason why the correlation matrix transform unit 514 transforms the elements of the square matrix A is as follows. That is, this is because the elements depending on the sound direction in the sound source correlation matrix $V_l$ are the part corresponding to the square matrix A and the components of the spectrum $S_l$ do not depend on the sound direction.

The correlation matrix transform unit 514 outputs the corrected sound source correlation matrix $V_l'$ to the target sound selecting unit 110. Accordingly, the target sound selecting unit 110 calculates the above-mentioned correlation matrix $K_\lambda$ for each target sound using the sound source correlation matrix $V_l'$ input from the correlation matrix transform unit 514 instead of the $V_l$.

Accordingly, According to this embodiment, it is possible to correctly estimate the sound direction information, even when the input direction information θ is changed and the sound direction $\psi_l$ relative to the apparatus (the sound direction estimation apparatus 5) is changed.

According to an aspect of this embodiment, the correlation matrix corresponding to the estimated sound direction is transformed using the correlation matrix information based on the input direction information and the sound directions of the separated sound signals are estimated based on the transformed correlation matrix. Accordingly, it is possible to estimate the sound direction based on the change of the input direction information.

A part of the sound direction estimation apparatuses 1 to 5 according to the above-mentioned embodiments, such as the first correlation matrix calculation unit 102, the sound source localization unit 104, the sound source separation units 105 and 405, the sound source identification unit 107, the second correlation matrix calculation units 108, 208, and 308, the target sound selecting unit 110, the sound source localization units 111, 211, 311, and 411, the transfer function storage unit 212, the direction input unit 513, and the correlation matrix transform unit 514 may be embodied by a computer. In this case, the part may be embodied by recording a program for performing the control functions in a computer-readable recording medium and causing a computer system to read and execute the program recorded in the recording medium. Here, the "computer system" is built in the speech recognition apparatuses 1 and 2 and the speech recognition robot 3 and includes an OS or hardware such as peripherals. Examples of the "computer-readable recording medium" include memory devices of portable mediums such as a flexible disk, a magneto-optical disc, a ROM, and a CD-ROM, a hard disk built in the computer system, and the like. The "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

In addition, part or all of the sound direction estimation apparatuses 1 to 5 according to the above-mentioned embodiments may be embodied as an integrated circuit such as an LSI (Large Scale Integration). The functional blocks of the musical score position estimating apparatuses 1 and 2 may be individually formed into processors and a part or all thereof may be integrated as a single processor. The integration technique is not limited to the LSI, but they may be embodied as a dedicated circuit or a general-purpose processor. When an integration technique taking the place of the LSI appears with the development of semiconductor techniques, an integrated circuit based on the integration technique may be employed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A sound direction estimation apparatus comprising:
   a sound source model storage unit that stores likelihood of a sound source class in correspondence with a sound feature quantity;
   a sound signal input unit that receives a sound signal;
   a sound source identification unit that identifies a sound source class of the sound signal input from the sound signal input unit with reference to the sound source model storage unit based on the sound feature quantity of the sound signal; and
   a first sound source localization unit that estimates a sound direction of the sound signal of the sound source class identified by the sound source identification unit.

2. The sound direction estimation apparatus according to claim 1, further comprising:
   a second sound source localization unit that estimates a sound direction of the sound signal input from the sound signal input unit; and
   a sound source separation unit that separates the sound signal input from the sound signal input unit into sound signals by sound sources based on the sound direction estimated by the second sound source localization unit,
wherein the first sound source localization unit estimates the sound directions of the sound signals separated by the sound source separation unit.

3. The sound direction estimation apparatus according to claim 2, further comprising a correlation matrix calculation unit that calculates a correlation matrix of the sound signals separated by the sound source separation unit,
wherein the first sound source localization unit estimates the sound directions of the sound signals separated by the sound source separation unit based on the correlation matrix calculated by the correlation matrix calculation unit and a correlation matrix of the sound signal input from the sound signal input unit.

4. The sound direction estimation apparatus according to claim 3, further comprising a correlation matrix information storage unit that stores correlation matrix information by discrete sound directions,
wherein the correlation matrix calculation unit calculates the correlation matrix corresponding to the sound direction estimated by the second sound source localization unit using the correlation matrix information corresponding to a discrete sound direction adjacent to the sound direction estimated by the second sound source localization unit.

5. The sound direction estimation apparatus according to claim 4, wherein the correlation matrix information includes a square matrix based on a transfer function vector having transfer functions from a sound source to sound input elements as elements and a ratio matrix indicating a ratio of the square matrix and a square matrix of the adjacent discrete sound direction,
wherein the correlation matrix calculation unit calculates a regular matrix by expanding eigenvalues of a square matrix obtained by interpolating the square matrix indicated by the correlation matrix information corresponding to the discrete sound direction in a frequency domain, and calculates a diagonal matrix by expanding eigenvalues of a square matrix interpolated by raising the ratio matrix indicated by the correlation matrix information corresponding to the discrete sound direction to power, and
wherein the correlation matrix calculation unit calculates the correlation matrix corresponding to the sound direction estimated by the second sound source localization unit using the regular matrix and the diagonal matrix.

6. The sound direction estimation apparatus according to claim 3, wherein the first sound source localization unit sets the correlation matrix of the sound signal input from the sound signal input unit to a unit matrix, calculates a spatial spectrum based on an eigenvector calculated by expanding eigenvalues of the correlation matrix calculated by the correlation matrix calculation unit, and estimates sound direction information in which the peak of the calculated spatial spectrum is minimized.

7. The sound direction estimation apparatus according to claim 2, wherein the sound source separation unit separates the sound signal input from the sound signal input unit into the sound signals by sound sources based on the sound directions estimated by the first sound source localization unit.

8. The sound direction estimation apparatus according to claim 4, further comprising:
a direction input unit that receives direction information; and
a correlation matrix transform unit that transforms the correlation matrix corresponding to the sound direction estimated by the second sound source localization unit by the use of correlation matrix information based on the direction information input from the direction input unit,
wherein the first sound source localization unit estimates the sound directions of the sound signals separated by the sound source separation unit based on the correlation matrix transformed by the correlation matrix transform unit.

9. A sound direction estimation method in a sound direction estimation apparatus having a sound source model storage unit that stores likelihood of a sound source class in correspondence with a sound feature quantity, the sound direction estimation method comprising:
causing the sound direction estimation apparatus to receive a sound signal;
causing the sound direction estimation apparatus to identify the sound source class of the input sound signal with reference to the sound source model storage unit; and
causing the sound direction estimation apparatus to estimate the sound direction of the sound signal of the identified sound source class.

\* \* \* \* \*